(12) United States Patent
Minemura et al.

(10) Patent No.: US 8,891,168 B2
(45) Date of Patent: Nov. 18, 2014

(54) OPTICAL ELEMENT AND OPTICAL APPARATUS

(75) Inventors: Hiroyuki Minemura, Kokubunji (JP); Yumiko Anzai, Saitama (JP); Hideharu Mikami, Kawaskai (JP)

(73) Assignee: Hitachi, Ltd., Tokyo (JP)

( * ) Notice: Subject to any disclaimer, the term of this patent is extended or adjusted under 35 U.S.C. 154(b) by 603 days.

(21) Appl. No.: 12/896,948

(22) Filed: Oct. 4, 2010

(65) Prior Publication Data

US 2011/0085238 A1 Apr. 14, 2011

(30) Foreign Application Priority Data

Oct. 7, 2009 (JP) .................. 2009-232953

(51) Int. Cl.
*G02B 5/30* (2006.01)
*H01Q 1/38* (2006.01)
*G02B 5/08* (2006.01)
*H01Q 9/04* (2006.01)

(52) U.S. Cl.
CPC ............... *G02B 5/3058* (2013.01); *H01Q 1/38* (2013.01); *G02B 5/085* (2013.01); *H01Q 9/0407* (2013.01)
USPC ................... 359/485.05; 359/485.07

(58) Field of Classification Search
None
See application file for complete search history.

(56) References Cited

U.S. PATENT DOCUMENTS

| | | | |
|---|---|---|---|
| 2003/0156325 A1 | 8/2003 | Hoshi | |
| 2006/0262398 A1* | 11/2006 | Sangu et al. | 359/486 |
| 2008/0067321 A1 | 3/2008 | Miyamoto et al. | |
| 2008/0218836 A1 | 9/2008 | Suzuki et al. | |
| 2009/0128908 A1 | 5/2009 | Nakazawa et al. | |

FOREIGN PATENT DOCUMENTS

| | | |
|---|---|---|
| JP | 2001-215462 | 8/2001 |
| JP | 2004-139001 | 5/2004 |
| JP | 2004-170623 | 6/2004 |
| JP | 2008-065961 | 3/2008 |
| JP | 2008-096677 | 4/2008 |
| JP | 2008-122618 | 5/2008 |
| JP | 2008-224313 | 9/2008 |
| JP | 2009-223123 | 10/2009 |
| WO | WO 2007/055245 A1 | 5/2007 |
| WO | WO 2009/125827 A1 | 10/2009 |

OTHER PUBLICATIONS

Tilman Glaser et al., Diffractive optical isolator made of high-efficiency dielectric gratings only, Applied Optics, Jun. 20, 2002, pp. 3558-3566, vol. 41, No. 18.
D. R. Smith, et al., Metamaterials and Negative Refractive Index, Science, Aug. 6, 2004, pp. 788-792, vol. 305, www.sciencemag.org.
Office Action in JP 2009-232953, dated Jun. 4, 2013, (in Japanese, 3 pgs.), [English language translation, 9 Pgs].
Office Action in JP2013-160079, dated Apr. 22, 2014, (in Japanese, 2 pgs.), [English language translation, 2 Pgs].

* cited by examiner

*Primary Examiner* — Derek S Chapel
(74) *Attorney, Agent, or Firm* — Antonelli, Terry, Stout & Kraus, LLP.

(57) ABSTRACT

The present invention provides a small and inexpensive optical element that integrates a reflecting mirror and a wave plate function. A reflecting wave plate is configured by arranging a periodic metal comb-like structure whose pitch is equal to or below a wavelength and a mirror structure with a distance equal to or below a coherence length.

11 Claims, 26 Drawing Sheets

TM light
(Ex Polarization)

TE light
(Hx Polarization)

TM light
(Ex Polarization)

(b) TE light
(Ey Polarization)

TM light
(Ex Polarization)

TE light
(Ey Polarization)

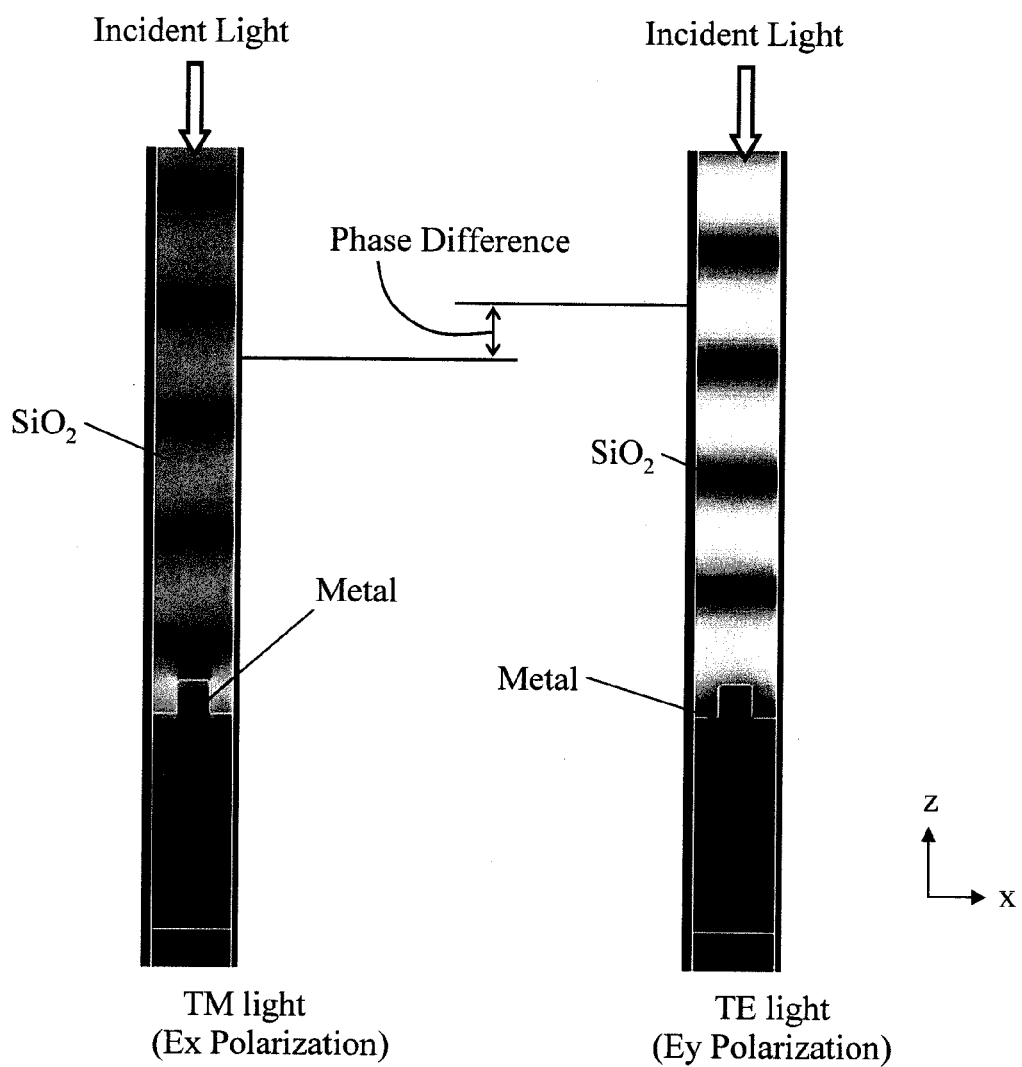

Incident TE, Sample Axis=45deg

Metal Groove

Dielectric Half Wave plate

Incident TE, Sample Axis=45deg
Metal: Ag, p=200nm, w=80nm h=20nm h=60nm h=100nm

Metal: Ag, p=200nm, w=80nm, h=80nm s=20nm s=50nm s=100nm

Metal: Ag

Metal: Al w=80nm w=60nm w=40nm

Conventional Configuration

With Metal Groove Element

OPTICAL ELEMENT AND OPTICAL APPARATUS

CLAIM OF PRIORITY

The present application claims priority from Japanese patent application JP 2009-232953 filed on Oct. 7, 2009, the content of which is hereby incorporated by reference into this application.

BACKGROUND OF THE INVENTION

1. Field of the Invention

The present invention relates to a birefringent, reflecting optical element provided with a sub-wavelength metal structure and an optical apparatus using the same.

2. Background Art

Optical apparatuses are widely used and optical elements for controlling light are often used for optical information communication apparatuses, displays, optical pickups, optical sensors or the like. As the functions of these apparatuses become more sophisticated, the optical elements are also required to have higher functions, higher added values and lower costs.

As an example of such optical apparatuses, "JP 2008-224313 A (corresponding to U.S. 2008/0218836 A)" discloses a demodulator technique of reducing deterioration of signal quality caused by PDFS (Polarization Dependent Frequency Shift) which occurs at the time of demodulation under a phase modulation scheme as a receiving apparatus of optical information communication with a phase compensation element. "JP 2008-122618 A" discloses a technique of improving optical utilization efficiency of a light source for a projector (display) using a metal structure smaller than a wavelength. "JP 2008-65961 A (corresponding to U.S. 2008/0067321 A)" discloses an optical pickup technique of improving an S/N ratio by causing reference light and signal light to interfere with each other using a homodyne scheme. These optical apparatuses realize desired functions by combining a plurality of reflecting mirrors, beam splitters for switching between optical paths according to the state of polarization of light and wave plates for converting the state of polarization of light or the like.

As a beam splitter taking advantage of a difference in the state of polarization of light, a polarized beam splitter using an optical multi-layer film, wire grid having a comb-like grid structure of metal wire arranged at an interval smaller than the wavelength or the like are known. Examples of the wave plate include one using optical anisotropic crystal represented by crystal and calcite and crystal and one having a dielectric comb-like grid structure arranged at an interval smaller than the wavelength as disclosed in "Applied Optics, 41, 3558 (2002)" and "WO 2007-055245 A1 (corresponding to U.S. 2009/0128908 A)." "Science, 305, 788 (2004)" comments on a technique about a meta-material whose refractive index is artificially controlled and negative refraction using a structure mainly made of metal which is smaller than the wavelength. Furthermore, "JP 2001-215462 A" discloses a technique on a high polymer film provided with a wave plate function mainly for a display. Furthermore, "JP 2004-170623 A" discloses a technique on a phase difference plate using a high polymer film.

"JP 2008-224313 A (corresponding to U.S. 2008/0218836 A)" to "JP 2008-65961 A (corresponding to U.S. 2008/0067321 A)" realize the functions as the respective optical apparatuses by combining a plurality of reflecting mirrors, optical elements having a polarized beam splitter function which switches between optical paths according to the state of polarization, optical elements having a wave plate function or the like. Here, it goes without saying that if a small and inexpensive new optical element that integrates a reflecting mirror and a wave plate function is realized, it is possible to reduce the size and cost of these optical apparatuses.

The wave plate is most expensive among the aforementioned optical elements. Conventional wave plates use birefringent optical anisotropic crystal, processed to a predetermined thickness. The optical anisotropic crystal has different refractive indexes between specific polarization (ordinary light) and polarization perpendicular thereto (non-ordinary light), and calcite as a typical example has a refractive index difference Δn of 0.17 at a wavelength 633 nm. By contrast, "Applied Optics, 41, 3558 (2002)" and "WO 2007-055245 A1" realize a wave plate (described as "polarization separation element" in "WO 2007-055245 A1") by applying micromachining to a dielectric material such as glass using a semiconductor process without using expensive optical anisotropic crystal. The pitch of such a dielectric microstructure needs to be smaller than the wavelength in order to avoid branching of incident light by diffraction. Furthermore, since the refractive index difference Δn is on the order of 0.2, the required aspect ratio of the comb-like structure is said to be equal to or above 7. If the aspect ratio of the comb-like structure is equal to or below 1, it is possible to manufacture the wave plate at low cost through an injection molding process used for CD and DVD or the like without using any semiconductor process requiring a large-scale manufacturing apparatus, but this cannot be realized by only the techniques disclosed in "Applied Optics, 41, 3558 (2002)" and "WO 2007-055245 A1." In comparison with these, the refractive index difference Δn between orthogonal polarizations of a liquid crystal material, which is said to be large, is on the order of 0.2 to 0.3.

On the other hand, the wave plates using a high polymer material described in "JP 2001-215462 A" and "JP 2004-170623 A" can provide low-cost members of large areas and are therefore mainly suitable for a display. However, these wave plates use a high polymer material, and cannot thereby surpass elements using an inorganic material in terms of performance and environmental resistance and are hardly applicable to the optical information communication apparatus and optical pickup described in "JP 2008-224313 A (corresponding to U.S. 2008/0218836 A)" and "JP 2008-65961 A (corresponding to U.S. 2008/0067321 A)."

In view of the above described problems of the conventional optical elements, it is an object of the present invention to provide a small and inexpensive new optical element which integrates a reflecting mirror, wave plate function or the like.

SUMMARY OF THE INVENTION

Solving the problems of the present invention presupposes that a new optical material is provided which significantly increases a refractive index difference Δn between polarizations orthogonal to each other. Such an optical material does not exist in the natural world, but the present invention will demonstrate with experiments and simulations that an artificially created refractive index difference Δn becomes equal to or above 5 by adopting a structure in which a metal comb-like structure and a mirror are arranged close to each other (hereinafter referred to as "metal groove") based on the concept of meta-material. The function and shape of the optical element and the configuration of the optical apparatus using such an optical element will be described more specifically based on this result.

Hereinafter, the present invention will describe a coordinate system whose x-axis and z-axis are taken within the surface of the sheet as a standard system. The polarization direction of light will be standardized to TE polarization and TM polarization. In this case, TE polarization is light having a vibration component of magnetic field in the x direction and TM polarization is light having a vibration component of electric field in the x direction. The numerical solution by Maxwell equations uses an FDTD (Finite Differential Time Domain) method. Unless specified otherwise, for refractive indexes of metal and semiconductor material, Palik's handbook (Palik E. D. (ed.) (1991) Handbook of Optical Constants of Solids II. Academic Press, New York) will be referred to. Furthermore, detailed descriptions of Maxwell equations, metal optics, plasmonics, optical/electric physical properties of amorphous material and operation principles of the individual optical apparatuses are beyond the scope of the present invention, and will therefore be omitted.

First, the origin of the refractive index difference obtained from the dielectric comb-like structure disclosed in "Applied Optics, 41, 3558 (2002)" and "WO 2007-055245 A1" will be described using a simulation result. FIGS. 2A and 2B show a calculation result about optical anisotropy of a comb-like structure using $SiO_2$ (silica glass). Calculations have been performed here assuming a case where the wavelength of incident light is 700 nm, comb pitch is 200 nm, comb width is 100 nm and comb height is 4000 nm and light enters from the air region at the top in the z direction. Suppose the refractive index of $SiO_2$ is 1.47. Because of the periodic boundary condition in the x direction, it is possible to calculate interaction between a structure that extends infinitely and a plane wave by calculating only one period of the comb structure. FIGS. 2A and 2B express the absolute value of the magnitude of electric field amplitude on a gray-scale and the distance between neighboring bright fringes corresponds to ½ wavelength. It is understandable that when incident light reaches the bottom end of the comb-like structure, a phase difference between TM polarization and TE polarization is just ½ wavelength and this element functions as a ½ wave plate. Furthermore, since TE polarization has one more fringe of electric field strength, the refractive index of TE polarization is greater and it is understandable from the ratio of the number of fringes of electric field strength that the refractive index difference Δn is 0.0875 (⅟15). The difference between both polarizations is caused by the difference in boundary condition on the side of the comb, that is, the difference in a condition of continuity between electric flux density D and electric field strength E. In the case of TM polarization, the fact that the brightness of fringe differs between the inside ($SiO_2$) and outside (air) of the comb reflects the boundary condition that the electric flux density D=∈Ex (∈ is a dielectric constant, Ex is an electric field component in the x direction) is constant. On the other hand, in the case of TE polarization, the fact that the electric field strength is uniform between the inside and outside of the comb reflects the boundary condition that the electric field strength Ey (Ey is an electric field component in a direction perpendicular to the surface of the sheet) on the side wall of the comb. Since light energy (photon density) is $\epsilon E^2/2$, it is understandable that more photons exist inside the comb having a large refractive index in the case of TM polarization. It is understandable that such a difference in the photon density distribution is the origin of the refractive index difference Δn. Therefore, as the difference between the refractive index of the dielectric substance that forms the comb-like structure and the refractive index of the periphery (air) increases, the Δn obtained also increases. Examples of a dielectric having a large refractive index include SiN and diamond, but since its upper limit is approximately 2.5, a drastic increase of Δn cannot be expected. Furthermore, when a dielectric having a large refractive index is used, a loss caused by reflection on the interface with air cannot be ignored either.

Next, operation principles of the wire grid will be described. As schematically shown in FIGS. 3A and 3B, the wire grid can be considered to have a comb-like structure of a period smaller than the wavelength. As shown in FIG. 3A, light can pass through the comb-like structure for TM polarization because free electrons in the metal are only concentrated on one side of the comb according to the vibration direction of the electric field, producing polarization. On the other hand, as shown in FIG. 3B, since free electrons in the metal vibrate without being constrained by the side wall of the comb for TE polarization, light is reflected in the same way as the continuous metal film. When the height of the comb is greater than the thickness to which light can enters the metal (Skin Depth), the wire grid constitutes an element having a polarization separation function with high separation performance (extinction ratio) that allows to pass TM polarization and reflects TE polarization. In the case of TM polarization, the behavior of free electrons in the metal is equivalent to plasmon in a broad sense, and if matching conditions with the peripheral dielectric (having the same magnitude of dielectric constant and an opposite sign) are met, light can propagate quite a large distance (on the order of several mm at maximum) with slight attenuation. Moreover, as also described in "Science, 305, 788 (2004)," since the magnitude of polarization that occurs in this case is quite large, polarizability χ of this space becomes by far greater than that of the dielectric. That is, it is possible to obtain an artificially large refractive index with the metal microstructure.

FIGS. 4A and 4B are examples of simulation result of the wire grid. Here, it is assumed that the wavelength of incident light is 700 nm, metal material is Ag, wire pitch is 200 nm, wire width is 100 nm and wire height is 100 nm. As is observed from FIGS. 4A and 4B, the wire grid has an excellent polarizing filter function that allows to pass only TM polarization.

It has been proven so far that it is difficult to increase the refractive index difference Δn obtained from the comb-like structure of a dielectric and that the wire grid includes a huge refractive index and provides a polarizing filter function but does not have the function as a wave plate.

Here, if the huge refractive index of the wire grid can be used as the refractive index difference Δn between polarizations orthogonal to each other, an excellent wave plate should be able to be created. FIG. 5 is a schematic diagram illustrating a basic structure of the element (metal groove). The metal groove is a merge of a wire grid and a metal mirror. In FIG. 5, TE polarization is reflected by the surface of the metal comb-like structure of the surface of the metal groove and TM polarization passes through the comb-like structure and reaches the mirror part, and is then reflected. Both polarizations interfere with each other after being reflected by the metal groove and are transformed into a state of polarization different from the incident light. Since TM polarization travels to and fro in the huge refractive index space of the metal comb structure, it is possible to obtain a large phase difference. That is, the metal groove can have the function of a reflecting wave plate with a low aspect ratio and high performance. The present invention will describe the metal comb-like structure by limiting the cross-sectional shape thereof to a rectangular shape for simplicity of explanation, but similar effects can be obtained as long as a conductor represented by metal is wire-shaped. Therefore, the cross-sectional shape is not limited to rectangular but may be trapezoidal, triangle or the like. Furthermore, the convex part of the comb-like structure is provided so as to extend in the y-axis direction in the example of FIG. 5, but it may be three-dimensionally pinholder-shaped. Furthermore, the size of the optical element of the present invention may be at least several times the wavelength of light in the medium in both the x-axis direction and y-axis direction so as to reduce influences of diffraction and scattering and obtain desired reflected light. The relationship between the size of the element and the magnitude of diffraction and scattering is obtained by solving Maxwell equations, but more specific contents will be omitted. The result is a common one along the wave nature of light as described above. The present application refers to the structure including those described above as a "comb-like structure." Furthermore, the material of the comb-like structure is not limited to metal but a metal-organic matter composite material, graphite, carbon nanotube or the like may be used as long as such a material has sufficient conductivity with respect to the wavelength of light used (electromagnetic wave and radio wave can also be used).

Next, a simulation of the metal groove, prototype manufacturing/experiment results will be described.

FIG. 6 is a cross-sectional view that summarizes parameters defining characteristics of the metal groove. As shown in FIG. 6, the metal groove is basically made of a substrate material and a metal material, and a pitch p, width w, height h of the comb-like structure and a thickness d of the mirror part are main structural parameters.

FIGS. 7A and 7B are examples of simulation result. Here, it is assumed that the substrate material is $SiO_2$, metal material is Ag, pitch p=200 nm, width w=100 nm, height h=100 nm, thickness of the mirror part d=300 nm and wavelength of incident light is 633 nm. The aspect ratio (h/w) of the comb-like structure is 1. It is observed in FIGS. 7A and 7B that there is a difference between TM polarization and TE polarization by approximately ½ of the distance between fringes of electric field strength resulting from interference between the incident light and reflected light and that this functions as a ¼ wave plate. Hereinafter, the present invention will show a simulation result assuming the substrate material as $SiO_2$ unless specified otherwise.

FIGS. 8A and 8B are examples of simulation result illustrating wavelength dependency of the metal groove. Here, it is assumed that the metal material is Ag, pitch p=200 nm, width w=80 nm, height h=40 nm and thickness of mirror part d=300 nm. The aspect ratio (h/w) of the comb-like structure is 0.5. Furthermore, the azimuth of the metal groove is assumed to be a position rotated by 45 degrees within the x-y plane and the intensity of each polarization component included in the reflected light with respect to the incident light of TE polarization. FIG. 8A shows that when the intensity of the TM polarization component is sufficiently small at the wavelength when the intensity of the TE polarization component is maximum (hereinafter referred to as "peak wavelength"), the metal groove functions as an excellent ½ wave plate. In FIGS. 8A and 8B, TE is shown by a solid line and TM is shown by a dotted line. Hereinafter, the present invention assumes, unless specified otherwise, that the azimuth of the metal groove is a position rotated by 45 degrees within the x-y plane and the case where TE polarization is introduced is assumed to be a standard condition for a simulation and experiment. As illustrated in FIG. 8A, it is understandable that the metal groove with the parameters shown here functions as an excellent ½ wave plate at a wavelength of approximately 580 nm. For comparison, FIG. 8B shows the calculation result of the case with a ½ wave plate manufactured by optical anisotropic crystal (the same also applies to the dielectric comb-like structure). Here, it is assumed that dispersion of the optical anisotropic crystal is sufficiently small. As the difference is clear from a comparison of the two, the metal groove can narrow the wavelength range where the metal groove functions as a wave plate. In principles, the optical anisotropic crystal unavoidably functions as a wave plate even at a wavelength of an integer multiple of the peak wavelength. When it is preferred to selectively operate the state of polarization on a specific wavelength from among light beams of a plurality of wavelengths, for example, in the case of an application of reduction of the number of parts in an optical pickup corresponding to CD/DVD/BD or the like, the metal groove has excellent characteristics compared to conventional wave plates. This is the effect brought about when the imaginary part of a complex refractive index of the metal material drastically changes especially with respect to the wavelength, that is, wavelength dispersion is large. Such a complex refractive index of metal or complex dielectric constant is described using a model that approximates a refractive index of metal as a motion of free electrons weakly constrained by atomic nucleus as represented by a Drude model. As the color of metal varies from one metal to another, dispersion characteristics in a visible light region differs from one metal material to another and taking advantage of this makes it possible to realize various designs with different wavelength dependency for the metal groove. A specific example will be shown in embodiments.

Here, constraints of FDTD simulation will be additionally described. An FDTD simulation cannot handle reflection on the surface of the substrate due to constraints of memory used or the like, and therefore light intensity unavoidably increases by the order of 4% compared to actual measurement.

FIGS. 9A to 9C show an example of a peak wavelength design method. This is a simulation result focused on the relationship between the height h and the peak wavelength of the comb-like structure. Here, assuming the metal material is Ag, pitch p=200 nm, width w=80 nm, thickness of the mirror part d=300 nm, the peak wavelength is calculated in three cases with the height h=20, 60 and 100 nm. It is observed in FIGS. 9A to 9C that the peak wavelength increases as the height h of the comb-like structure is increased. Furthermore, assuming that a maximum value of the ratio of light converted to TM polarization is referred to as "conversion efficiency," the conversion efficiency is approximately 60% when the height h=20 nm and substantially 100% when the height h=60, 100 nm. While the conversion efficiency is fixed to 100% with the conventional ½ wave plate, one of features of the metal groove is that the conversion efficiency is made variable according to the aspect ratio (h/w). An embodiment of the optical element capitalizing on this feature will be described later. A lower limit of the aspect ratio of the metal groove will be described. The metal groove obtains a large variation of conversion efficiency in the vicinity of the condition shown in FIG. 9A, h/w=20 nm/80 nm=0.25 and does not function when the aspect ratio is 0. Therefore, the lower limit of the aspect ratio at which the metal groove effectively functions as an optical element is generally on the order of 0.1.

Next, prototype manufacturing of the metal groove and evaluation results will be shown. FIG. 10 is a schematic diagram illustrating a configuration of an experimental apparatus for evaluating the prototype element manufactured. A spectrophotometer (U4100 manufactured by Hitachi, Ltd.) was used to perform measurement under the aforementioned standard conditions. Since the element size is 4 mm×3 mm, a 5° regular reflection measurement jig with a measurement region 2 mmφ was used for the spectrophotometer, two Gran-Taylor prisms manufactured by Lambert were attached as an analyzer and a polarizer respectively.

FIG. 11 illustrates evaluation results of the prototype element. Here, an element pattern of pitch p=200 nm was created on the glass substrate using an electron beam drawing apparatus and metal grooves of different heights h of the comb-like structure were prototyped using an imprint method and a sputtering method. In FIG. 11, electron microscope photographs of the glass substrate are shown. An AgPdCu alloy was selected as the metal material. It could be proven as shown in FIG. 11 that the peak wavelength was shifted to the long wavelength side as h was increased from 60 nm to 100 nm to 180 nm in the same way as the simulation result. Furthermore, an excellent result was obtained showing that maximum values of light intensity at peak wavelengths were all equal to or above 80%.

FIG. 12 shows a comparison between the prototype element evaluation results and simulation results. It is understandable that excellent coincidence is observed between the experiment and the simulation in the relationship between the height h of the comb-like structure which is one of performance control parameters of the metal groove and the peak wavelength. This result shows that the refractive index difference Δn between polarizations orthogonal to each other obtained by the metal groove is approximately 6, which is approximately 20 times as large as the conventional value.

Here, a configuration has been described in which the wire grid and the metal mirror are merged as a configuration example of the metal groove. However, these need not always be merged and may be separated as long as they are within the coherence length of light used (equivalent to the reciprocal of the spread of the wavelength spectrum). This is because if the distance between the two is equal to or above the coherence length of light, the TE polarization component and the TM polarization component do not interfere with each other and as a result, the metal groove cannot operate the state of polarization as the wave plate. Generally, the coherence length is on the order of several wavelengths in the case of a light source such as a mercury lamp, cold cathode tube and non-polarization light source like sunlight, on the order of several tens of wavelengths in the case of a semiconductor laser used for an optical pickup and equal to or above 100 wavelengths in the case of communication laser and gas laser. Therefore, an element with a wire grid element and a mirror formed on both sides of a glass substrate having a thickness of on the order of 1 mm does not function as a wave plate for a mercury lamp or semiconductor laser for an optical pickup from the standpoint of interference. When the accuracy of the thickness of the glass substrate and influences of temperature variation of refractive index or the like are taken into consideration, such an element is inferior to the present invention from the standpoint of stability and reliability. As described above, the present invention is provided with inventive steps that could not be realized by a simple combination of the prior arts.

As described so far, the metal groove of the present invention combines the functions of the reflecting mirror and the wave plate and can provide a new optical element with a small aspect ratio and excellent processability. Hereinafter, the present invention will disclose technical contents on an optical element and optical apparatus having the functions of any one of waveguiding, modulation and detection of light (electromagnetic wave, radio wave) using a metal groove.

The present invention can provide a new optical element which combines the functions of at least a reflecting mirror and a wave plate, capable of structurally setting optical characteristics, realizing high processability and a cost reduction. An optical apparatus using the present element will be described in embodiments.

BRIEF DESCRIPTION OF THE DRAWINGS

FIGS. 7A and 7B illustrate examples of simulation results of the optical element of the present invention.

DETAILED DESCRIPTION OF THE PREFERRED EMBODIMENTS

Hereinafter, embodiments of the present invention will be described with reference to the accompanying drawings.

Embodiment 1

<Creation Method>

Figure 13A:
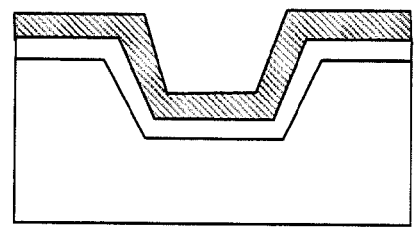
FIGS. 13A to 13C are schematic diagrams illustrating a method of creating the optical element of the present invention.
Figure 13B:
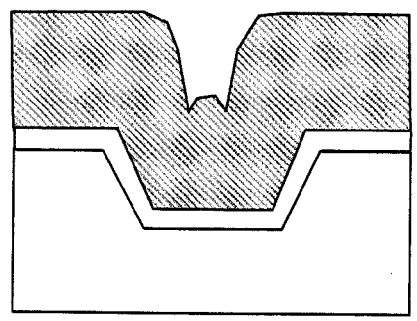
Figure 13C:
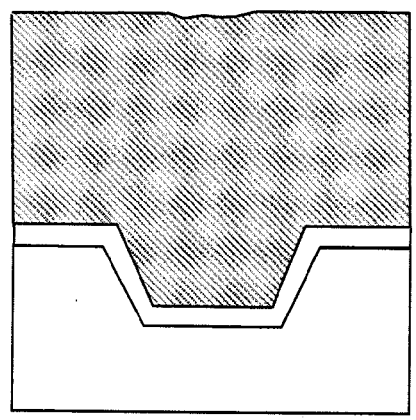

FIGS. 13A to 13C illustrate the most inexpensive method for manufacturing a metal groove. As descried above, it is well known that a transparent plastic substrate having a predetermined uneven pattern can be created using an injection molding method applied to a CD or DVD. Such a manufacturing method can be used because the metal groove has a small aspect ratio. With a CD or DVD, information pits and guide grooves are formed concentrically, whereas the metal groove basically needs only to have a rectilinear groove pattern. A metal layer is formed on the plastic substrate using a sputtering method and, the unevenness of the surface is gradually smoothed as the film thickness of the metal layer formed increases as shown in FIG. 13A to FIG. 13C. In this case, an adhesive layer may be formed between the plastic substrate and the metal layer to improve the adhesiveness therebetween as shown in FIGS. 13A to 13C. As the material of the adhesive layer, metal such as Mo, Cr, Ta and an oxide thereof are effective. When these materials are used, a standard value for the film thickness of the adhesive layer is on the order of 0.5 to 2 nm. When turned upside down, the shape shown in FIG. 13C is the same element structure as that shown in FIG. 5. Actually, when high performance is required according to usage, the metal groove may be created on a glass substrate using a lithography process as described above to reduce the birefringence index of the plastic substrate or a nano-imprinting method or the like using UV-curing resin may be used depending on the purpose. Furthermore, as the metal material, in addition to the aforementioned Ag, Ag alloy, metal such as Au, Cu, Pt, Fe, Cr, Mo and W or an alloy thereof may be used. Moreover, instead of using a transparent substrate such as glass or plastic, a metal groove may also be formed on a Si substrate. In this case, etching a thick metal film formed beforehand and leaving the comb-like structure is one of methods with fewer steps.

Embodiment 2

<Optical Element>

Figure 1:
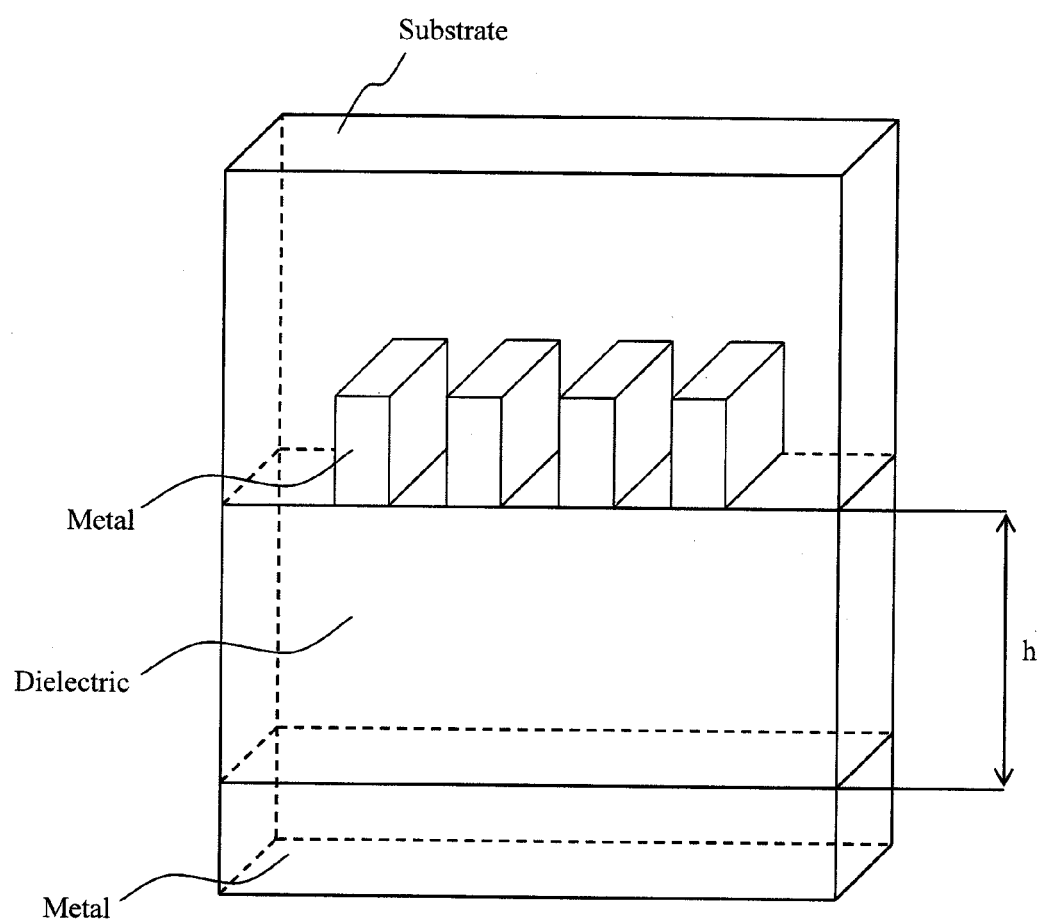
FIG. 1 is a diagram illustrating a configuration of an optical element of the present invention.
Figures 2A, 2B:
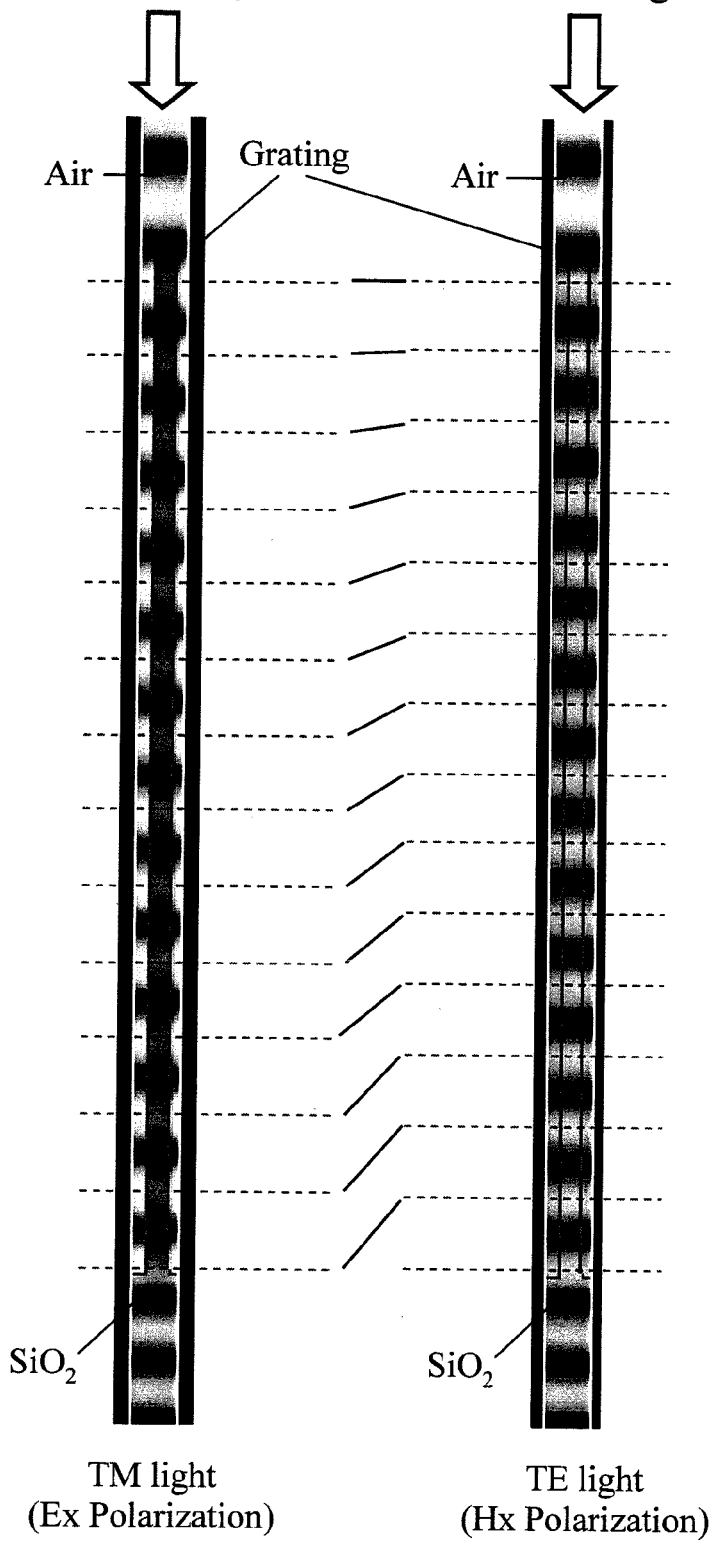
FIGS. 2A and 2B illustrate simulation results on optical anisotropy of the comb-like structure.
Figure 3A:
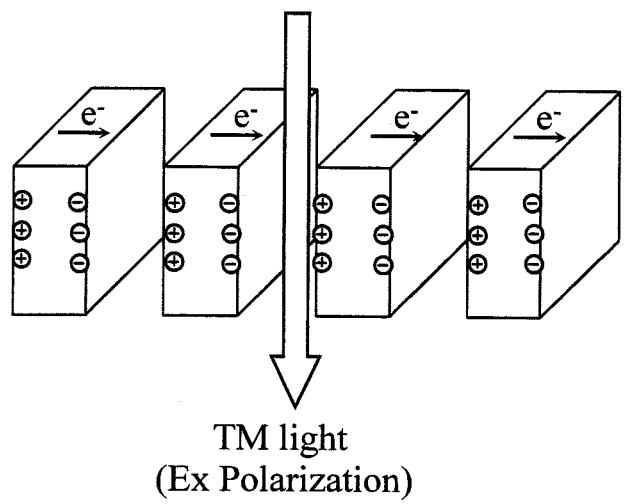
FIGS. 3A and 3B are schematic diagrams illustrating operation of the wire grid.
Figure 3B:
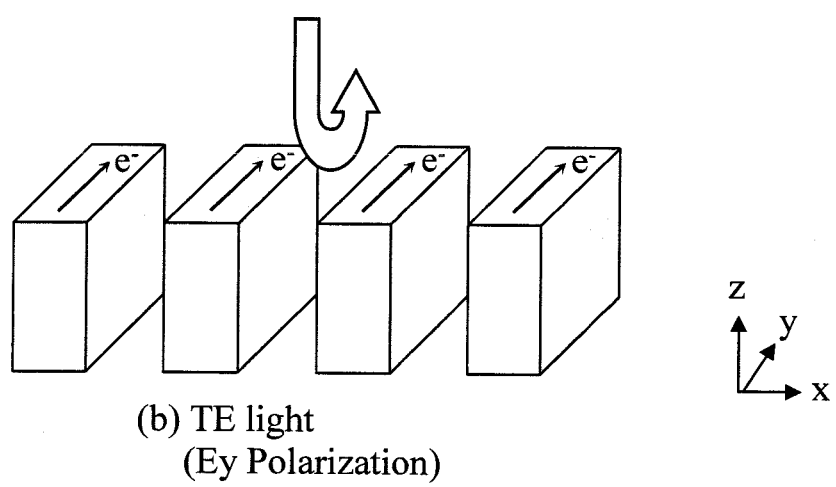
Figure 4A:
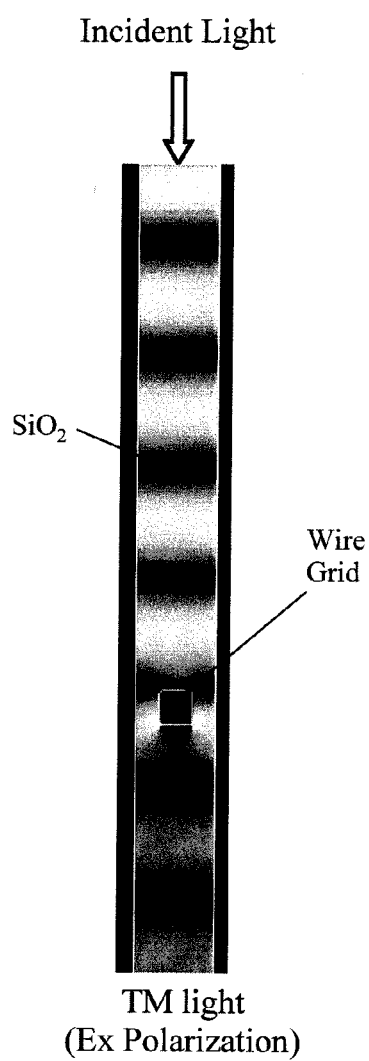
FIGS. 4A and 4B illustrate simulation results of the wire grid.
Figure 4B:
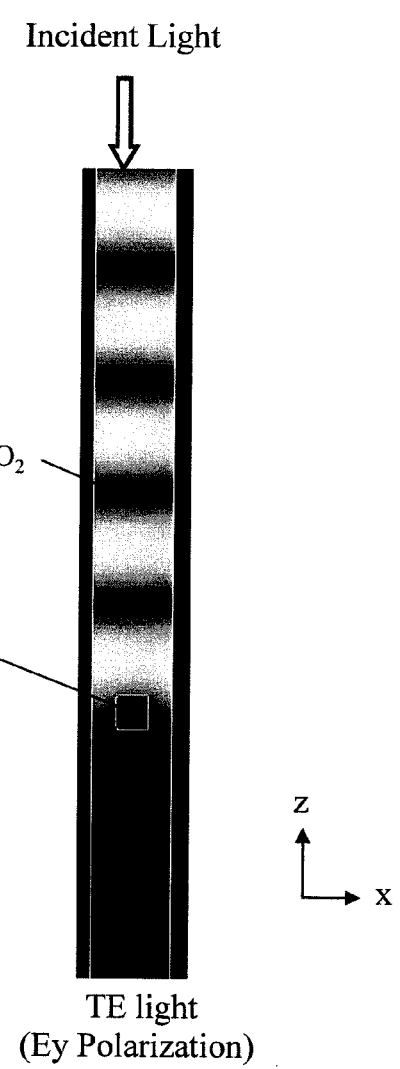
Figure 14A:
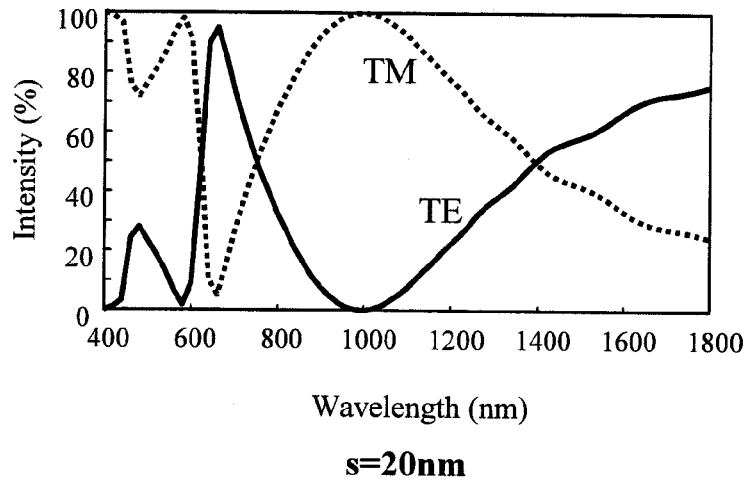
FIGS. 14A to 14C illustrate examples of simulation results showing a relationship between a thickness of an inter-layer dielectric and wavelength dependency of the optical element of the present invention.
Figure 14B:
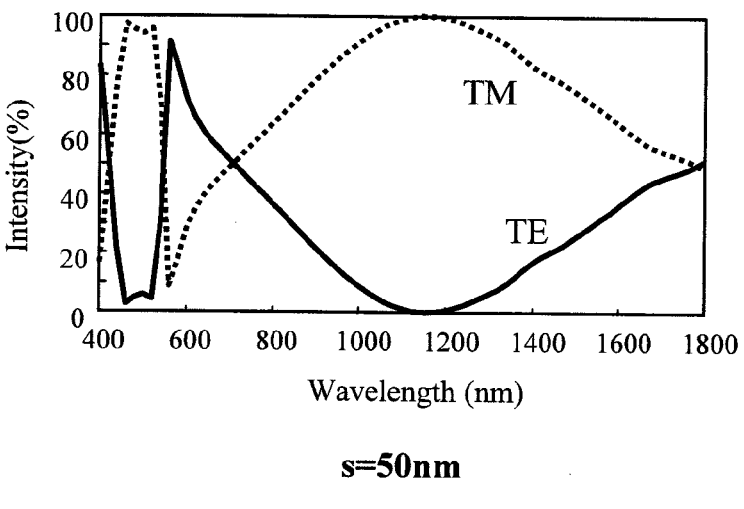
Figure 14C:
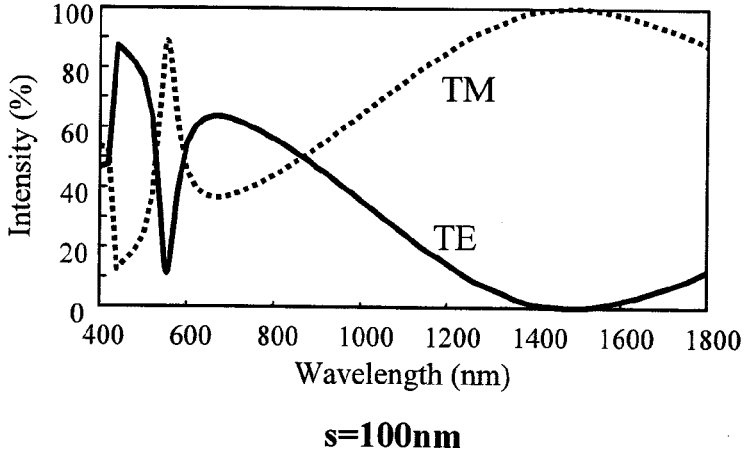

FIG. 1 is a schematic diagram illustrating another configuration of the metal groove. This is a structure with a dielectric interposed between the wire grid and the mirror of the comb-like structure, and is a most general structure of the metal groove. Here, suppose the thickness of an inter-layer dielectric between the wire grid section and a mirror part is s. FIGS. 14A to 14C illustrate simulation results showing a relationship between the thickness s of the inter-layer dielectric and wavelength dependency of the metal groove. Here, assuming that the metal material is Ag, inter-layer dielectric material is $SiO_2$, pitch of the comb-like structure p=200 nm, width w=80 nm, height h=80 nm and thickness of the mirror part d=300 nm, calculations were performed on three cases of the thickness of the inter-layer dielectric s=20, 50, 100 nm. It is understandable from FIGS. 14A to 14C that the peak wavelength can be adjusted by also changing the thickness s of the inter-layer dielectric. This is because as the thickness of the dielectric is increased, the optical path length of TM polarization can be increased. According to the aforementioned description, the peak wavelength is changed by the height of the comb-like structure, that is, the aspect ratio. On the other hand, when the height of the comb-like structure is changed, the reflection factor or erasure ratio of TE polarization and loss by Joule's heat are also changed simultaneously, but since the wire grid section and the mirror part can be merged, the element can be manufactured at low cost. On the other hand, the method shown here is a method similar to that of changing the peak wavelength by the thickness of an optical anisotropic crystal. Although the structure is more complicated, the peak wavelength can be adjusted more accurately and linearly, and therefore this is an adjustment method and an element structure suitable for applications requiring high performance. Here, a case has been described as an example where $SiO_2$ is used as the inter-layer dielectric material, but the material is not limited to a dielectric but semiconductor or a resin material may be used as long as a necessary sufficient transmissivity to the wavelength of light used (electromagnetic wave) can be obtained. For example, crystal Si has a sufficient transmissivity for infrared light and when light of a millimeter wave band is used, polyimide resin, styrofoam, rubber or the like can also be used.

Figure 15:
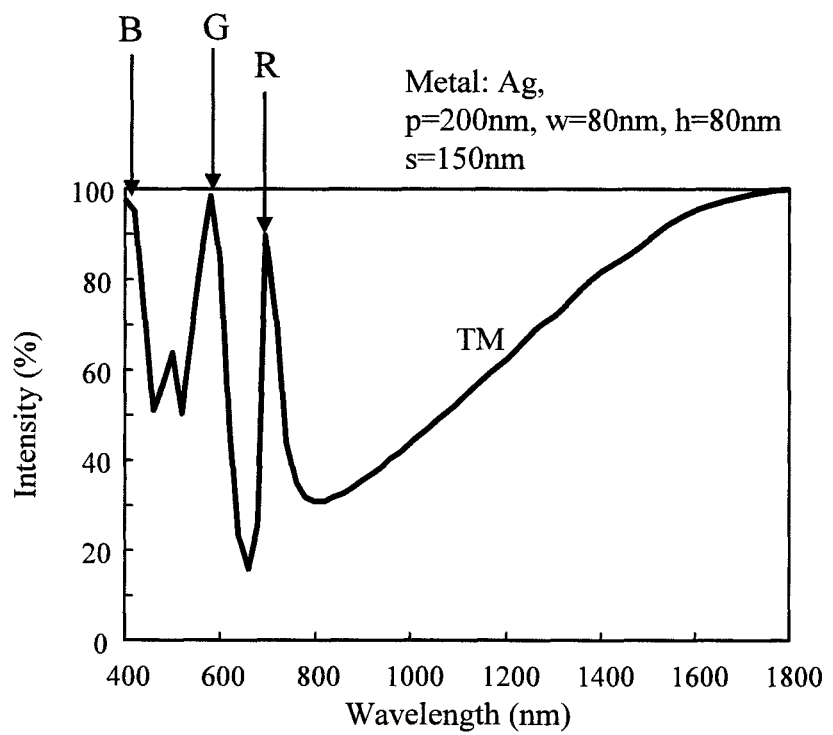
FIG. 15 illustrates an example of simulation results of wavelength dependency of the optical element of the present invention.

FIG. 15 illustrates simulation results when the thickness of the inter-layer dielectric s=150 nm. It is observed in FIG. 15 that high level interference peaks exist at wavelengths approximately corresponding to R, G and B. High level interference peaks appear because the variation in s is an action similar to a variation in thickness of the conventional element. Using such an element allows the metal groove to operate at a plurality of wavelengths for applications such as a display.

Figure 5:
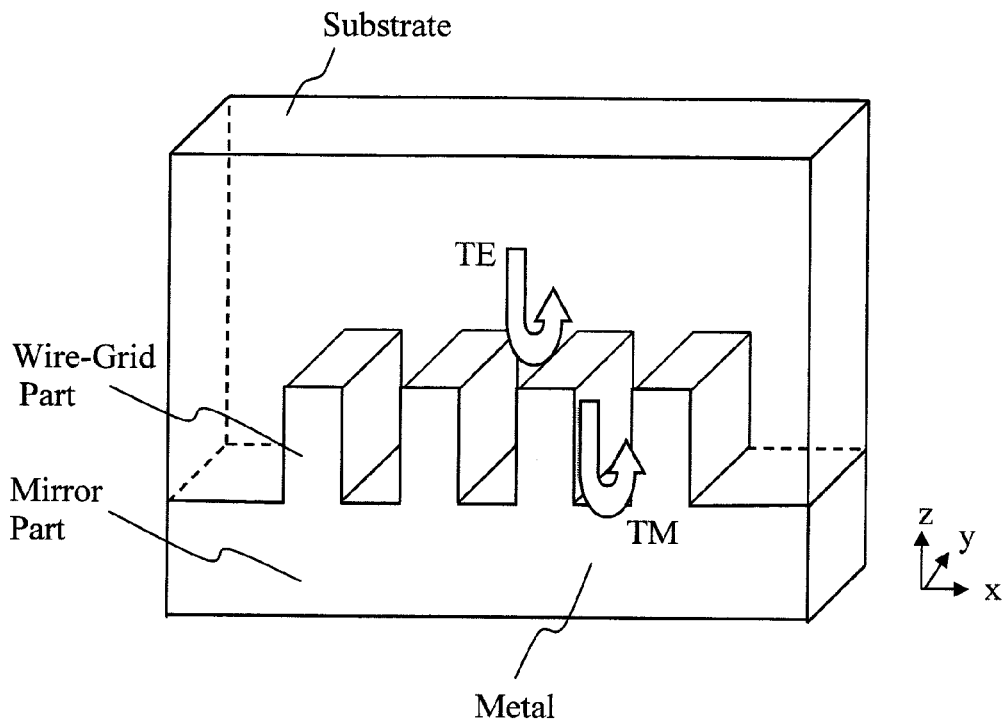
FIG. 5 is a diagram illustrating a basic configuration of the optical element of the present invention.
Figure 6:
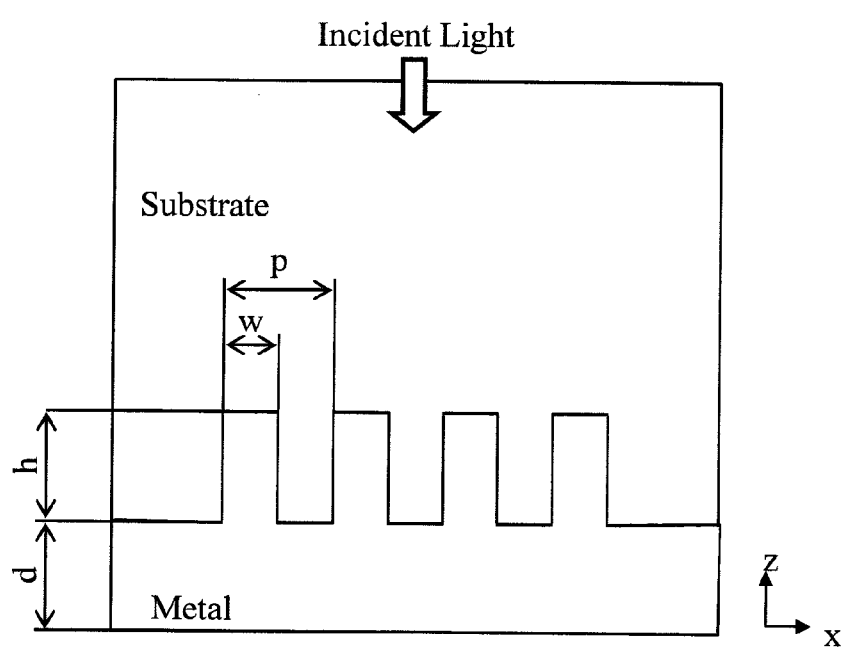
FIG. 6 is a diagram illustrating main parameters that define characteristics of the optical element of the present invention.
Figure 8A:
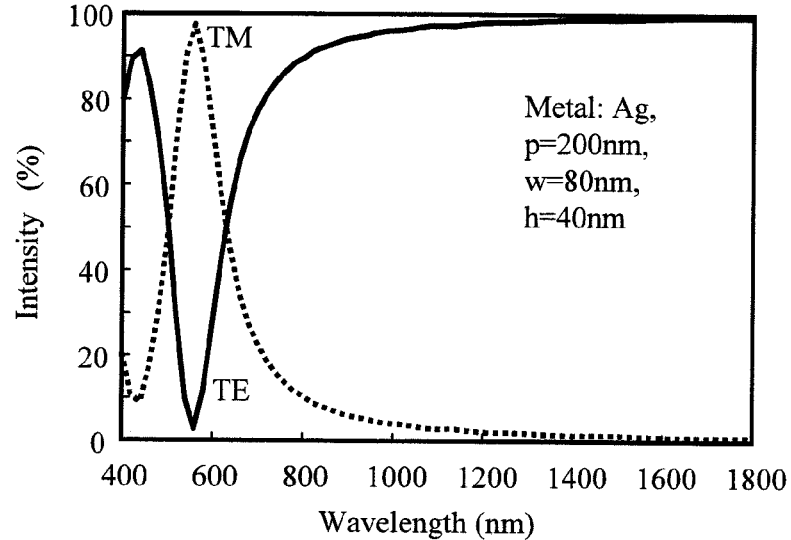
FIGS. 8A and 8B illustrate examples of simulation results on wavelength dependency of the optical element of the present invention.
Figure 8B:
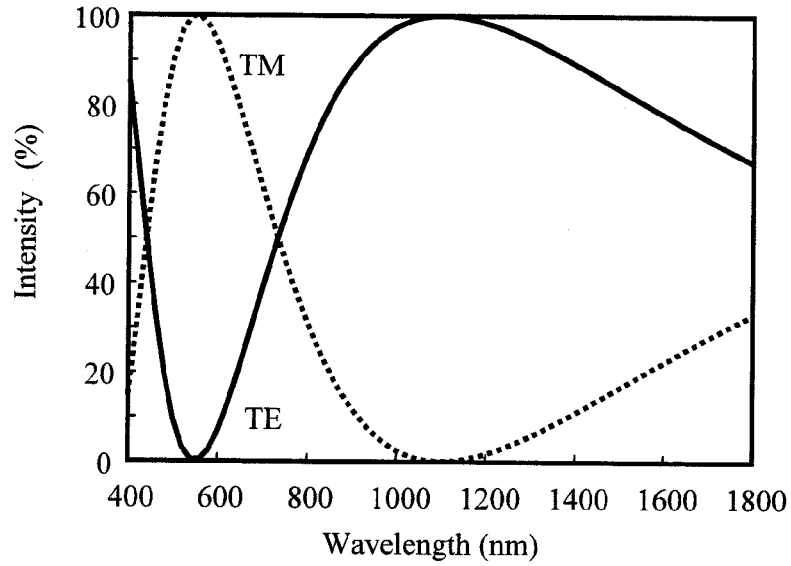
Figure 16A:
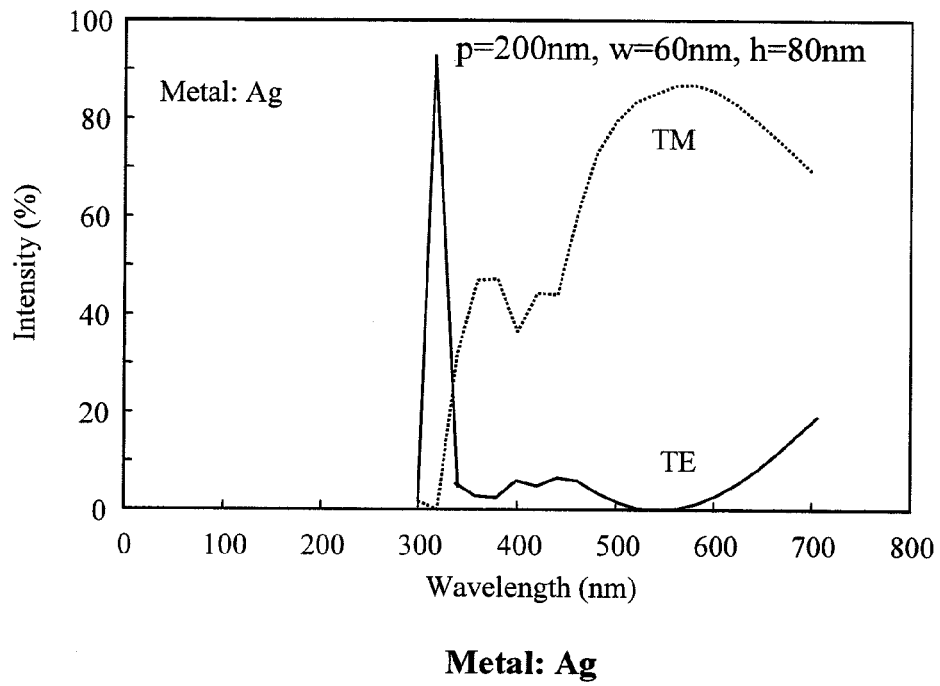
FIGS. 16A and 16B illustrate examples of simulation results showing differences among metal materials of wavelength dependency of the optical element of the present invention.
Figure 16B:
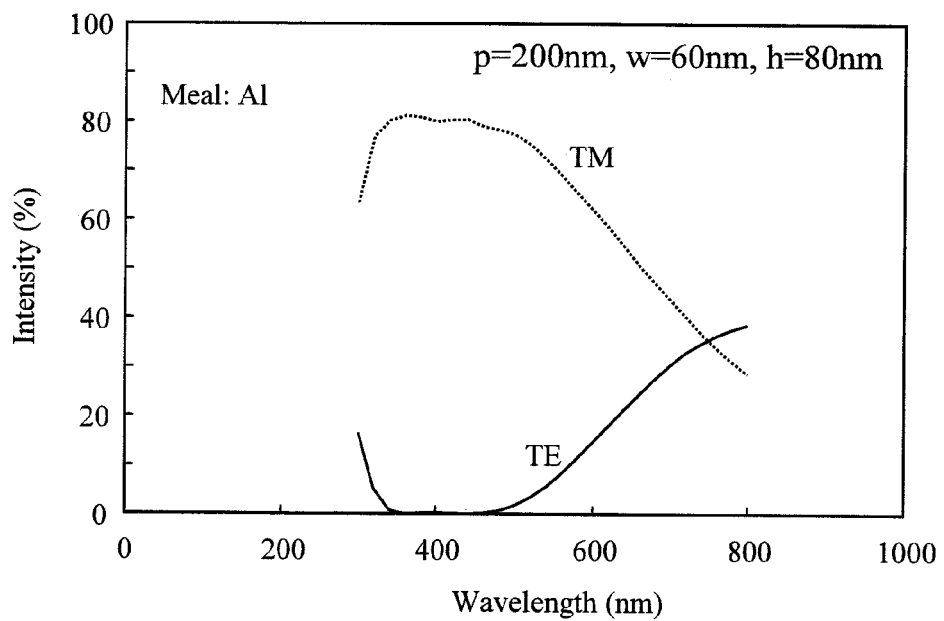

Next, effects when the metal material is changed will be described. FIGS. 16A and 16B illustrate simulation results of the integral type element structure in FIG. 5 showing a comparison when the metal material is Ag and Al. Here, it is assumed that the pitch p=200 nm, width w=60 nm and height h=80 nm of the comb-like structure and the thickness of the mirror part d=300 nm. As shown in FIG. 16A, when the metal material is Ag, the region of wavelength 500 to 700 nm includes a region where the intensity of TM light is large. On the other hand, as shown in FIG. 16B, when the metal material is Al, the region of wavelength 350 to 500 nm includes a region where the intensity of TM light is large. As described above, it is understandable that different types of wavelength dependency are obtained even when the shape is the same according to the wavelength dependency of the complex refractive index of the metal material. This shows that it is possible to manufacture elements of different types of wavelength dependency using the same metal die by changing the composition of an appropriate alloy material. Furthermore, this also shows that desired wavelength dependency can be obtained even with the element of a uniform pattern by changing the type of metal material to be formed into a film depending on the place.

Figure 17A:
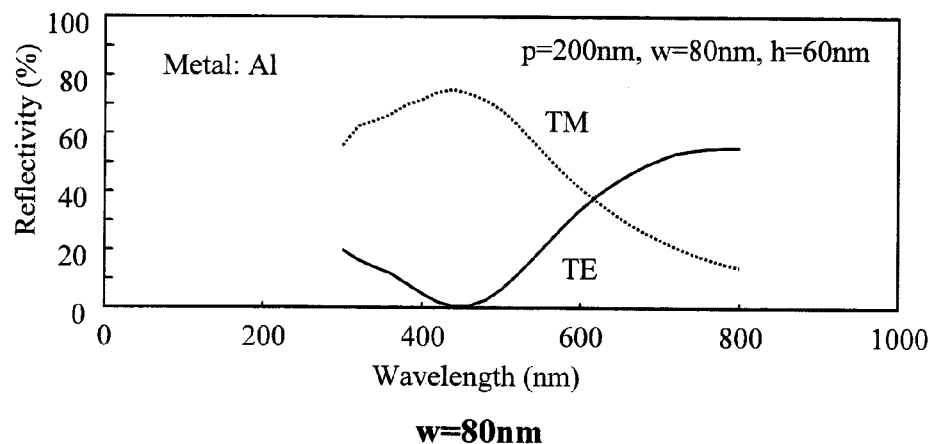
FIGS. 17A to 17C illustrate examples of simulation results when Al is used as the metal material of the optical element of the present invention.
Figure 17B:
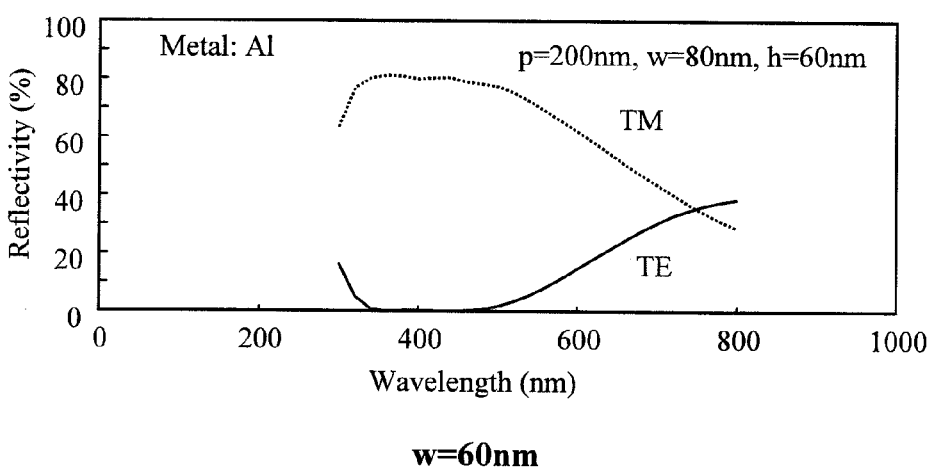
Figure 17C:
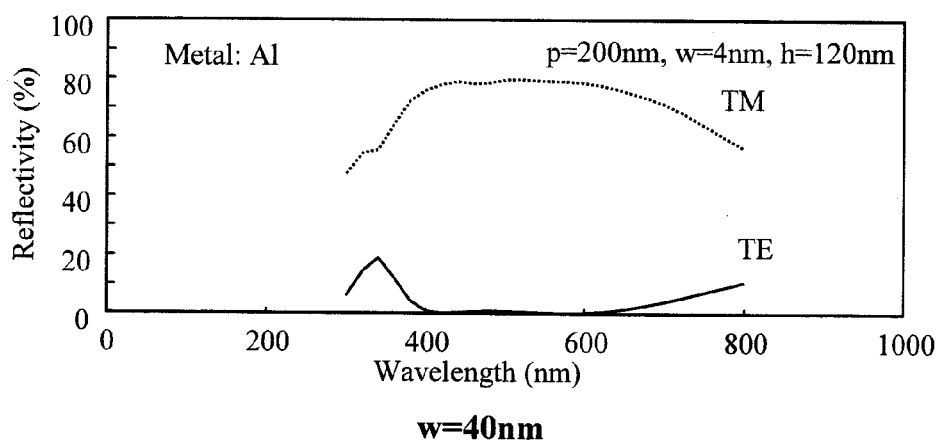

FIGS. 17A to 17C illustrate simulation results when Al is used as the metal material. Here, assuming the pitch of the comb-like structure p=200 nm, the height h=60, 80, 120 nm were assumed for cases with the width w=80, 60, 40 nm respectively. As shown in FIGS. 17A to 17C, it is understandable that when the width w is decreased and the height h is increased at the same time, the wavelength range where excellent ½ wave plate performance is obtained extends. In the case of FIG. 17C in particular, the ½ wave plate performance is obtained over substantially the entire region of visible light. The aforementioned example shows that it is possible to realize an element having peaks at a plurality of wavelengths through high level interference, while it is possible to realize an element that obtains broad wavelength characteristics in this example. Which one is to be selected may be determined according to usage as appropriate.

In the example of FIG. 1, the entire mirror part is formed of metal, but only the reflecting surface may be formed of metal and other parts may be made of other materials.

Embodiment 3

<Optical Apparatus>

Hereinafter, an optical apparatus to which the optical element of the present invention is applied will be described using the accompanying drawings.

Figure 18:
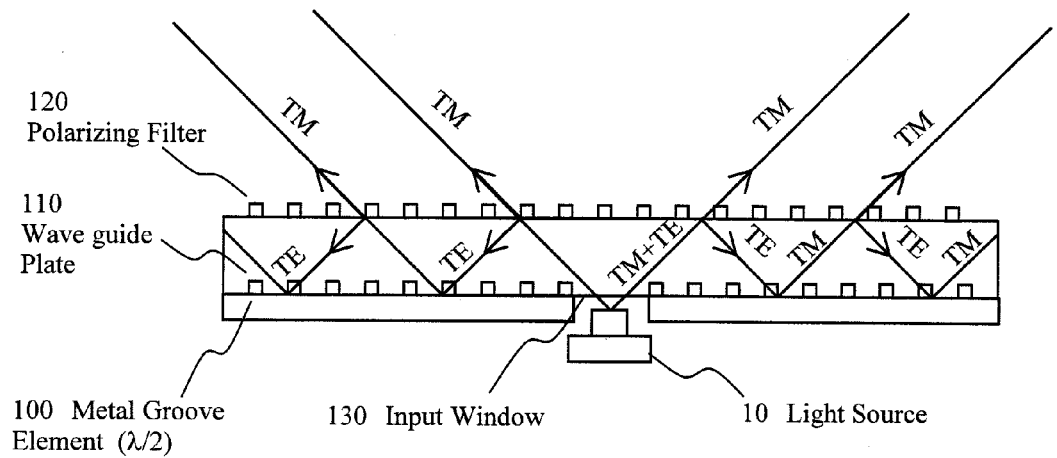
FIG. 18 illustrates an embodiment of a light source optical system using the optical element of the present invention.

FIG. 18 is a schematic diagram illustrating a configuration of a light source optical system using the optical element of the present invention. This is an example of an optical apparatus that guides light with high efficiency using a metal groove. In FIG. 18, a non-polarized light beam emitted from a light source 10 enters a wave guide plate 110 from an input window. The metal groove of the present invention is formed on the incident light side of the wave guide plate 110 and a polarizing filter 120 such as a wire grid that allows to pass TM polarization and reflects TE polarization is formed on the light emitting side. In such a configuration, of the light emitted from the light source, the TM polarization component passes and the TE polarization component is reflected by the polarizing filter 120, reflected by the metal groove 100 and at the same time converted to TM polarization, passes through the polarizing filter and is emitted. Such a configuration improves light utilization efficiency in a projector or display optical system using a liquid crystal element (not shown). As is well known, this is because the liquid crystal element has an intensity modulation function only for a polarization in a specific direction. Here, a non-polarized light source such as LED, cold cathode tube and high-pressure mercury lamp is used as the light source. Furthermore, an optical system can be formed as an integral part by creating a predetermined pattern on both sides of the wave guide plate 110 through injection molding and forming a metal thin-film using a sputtering method or the like. When a wire grid is used as the polarizing filter, after forming the wire grid and the mirror using the same method described above, the mirror part may be removed by polishing it using a CMP method or the like.

Figure 19:
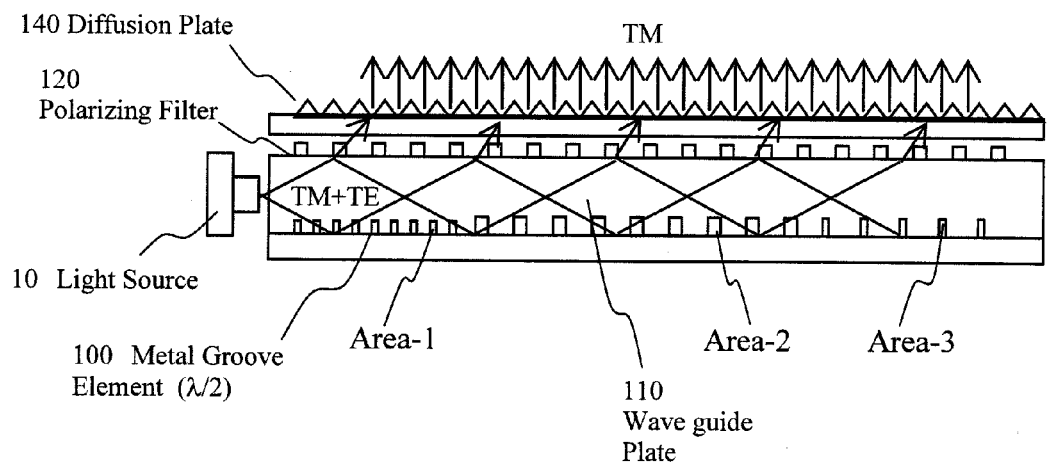
FIG. 19 is another embodiment of the light source optical system using the optical element of the present invention.

FIG. 19 is another embodiment of the light source optical system using the optical element of the present invention. This example corresponds to a case where light from the light source enters from one side of the element including the metal groove and assumes an application of a small liquid crystal display for a cellular phone or the like for an illumination optical system. In this case, it is necessary to extract upward light of uniform intensity in FIG. 19. In order to realize this, the present embodiment divides a metal groove 100 into areas 1 to 3 or the like and forms comb-like structures of different pitches, widths and heights. The metal groove can set peak wavelengths and conversion efficiency by changing parameters of the comb-like structure as shown in, for example, FIGS. 9A to 9C. Furthermore, as shown in FIG. 14A to FIG. 17C, it is also possible to design a wavelength range that functions as a peak wavelength or wave plate by selecting a parameter or metal material of the comb-like structure. When a white color LED or the like is used as the light source or when independent LEDs are used for R, G and B or the like, such an area division becomes one of effective means according to the type of the light source and requirements. Performing the area division causes only the substrate pattern to change, and therefore the merit of the metal groove of being manufacturable at low cost is not lost.

Figure 20:
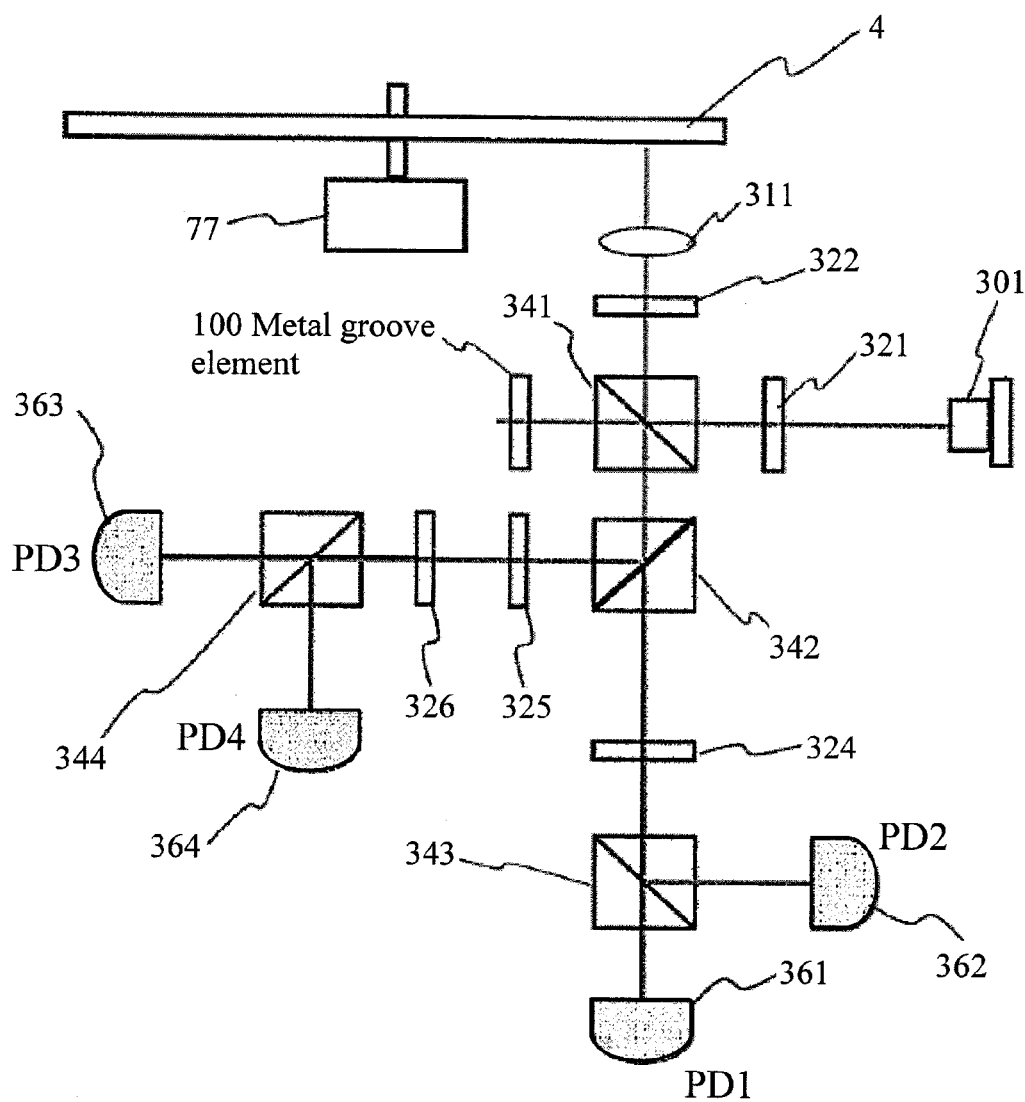
FIG. 20 is an embodiment of an optical pickup having a homodyne detection system using the optical element of the present invention.

FIG. 20 is a schematic diagram illustrating a configuration of an optical pickup having a homodyne detection system using the optical element of the present invention. The optical pickup having the homodyne detection system described in "JP 2008-65961 A" amplifies the signal amplitude by causing signal light reflected from an optical disk medium to interfere with reference light and thereby improves the quality of a playback signal. In FIG. 20, the operation principle will be described in brief. Light emitted from a semiconductor laser 301 passes through a ½ wave plate 321 and the polarization direction thereof is thereby rotated by 45 degrees. The light with rotated polarization is separated into two polarizations orthogonal to each other by a polarized beam splitter 341, one polarized light beam (playback light) is reflected, passes through a ¼ wave plate 322, thereby converted to circular polarization, condensed by an objective lens 311 and irradiated onto an optical disk 4. The reflected light (signal light) from the optical disk 4 rotated by a spindle motor 77 is returned to parallel light again by the objective lens 311 and converted to linear polarization whose polarization direction is orthogonal to the original light by the ¼ wave plate 322. Thus, the signal light passes through the polarized beam splitter 341 and travels toward a beam splitter 342. First, the component (reference light) called "reference light" that has passed through the polarized beam splitter 341 is converted to polarization whose state of polarization is orthogonal and reflected by the metal groove 100 of the present invention, reflected by the polarized beam splitter 341, combined with the signal light and travels toward the beam splitter 342. In this case, the signal light and the reference light are combined in such a way that their polarization directions are orthogonal to each other.

One portion of the combined light passes through the beam splitter 342, which is a half mirror, after being rotated by 45 degrees in the polarization direction thereof by a ½ wave plate 324, is separated into linear polarizations orthogonal to each other by a polarized beam splitter 343, and are detected by a detector 361 (PD1) and a photodetector 362 (PD2). Likewise, the other portion of the combined light is reflected by the beam splitter 342, which is a half mirror, given a phase difference of π/2 between the signal light and the reference light by a ¼ wave plate 325, rotated by 45 degrees in the polarization direction thereof by a ½ wave plate 326, separated into linear polarizations orthogonal to each other by a beam splitter 344, and are detected by a detector 363 (PD3) and a photodetector 364 (PD4). Through phase diversity detection using the four photodetectors PD1 to PD4, it is possible to cancel out influences of variations in optical path difference and obtain an excellent playback signal. Here, "JP 2008-65961 A" describes a ¼ wave plate and a mirror mounted instead of the metal groove element. Using the metal groove of the present invention can reduce the number of parts and reduce the size and cost of the optical pickup. The present invention is not limited to this example, but by replacing an optical system provided with a unit that rotates the polarization direction of reflected light by 90 degrees using a combination of a ¼ wave plate and a mirror or an optical system provided with a ½ wave plate with the metal groove of the present invention, it is likewise generally possible to reduce the number of parts and costs.

Figure 21:
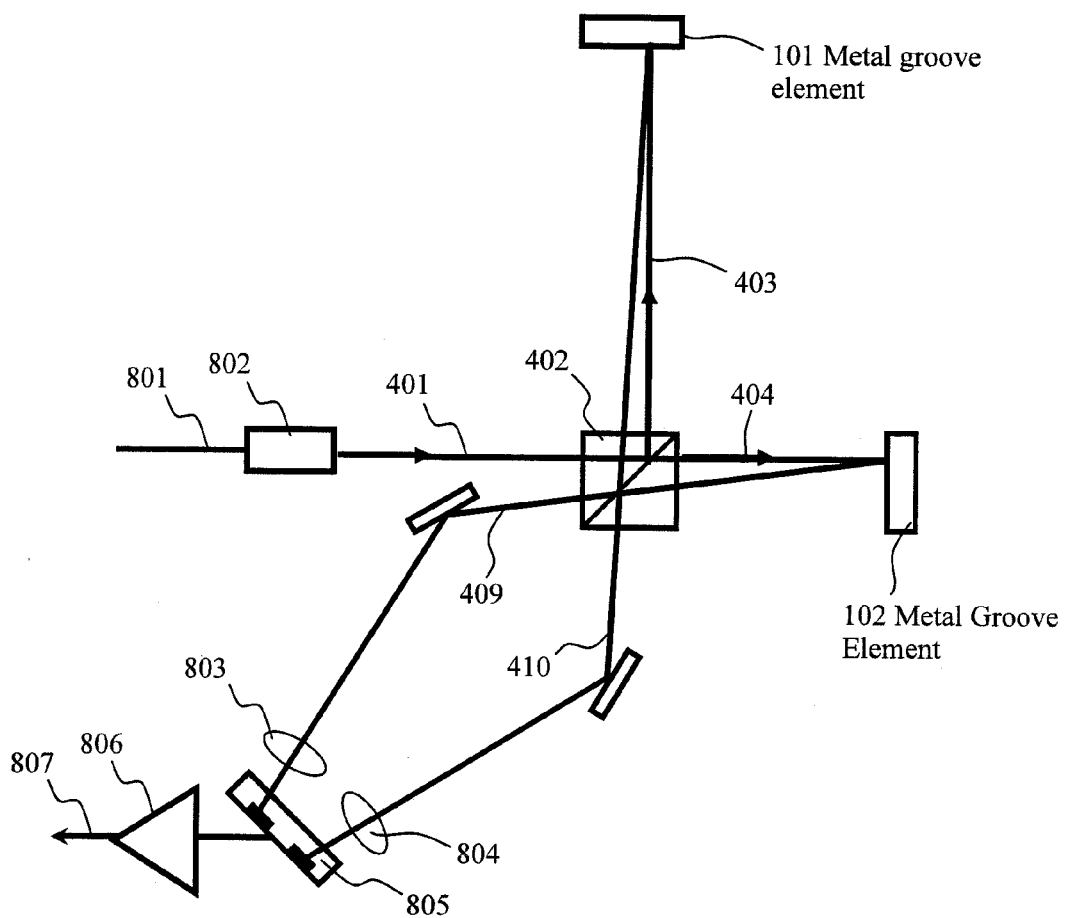
FIG. 21 is an embodiment illustrating a configuration of an optical system of a detector module for optical communication using the optical element of the present invention.

FIG. 21 shows a configuration of an optical system of a detector module for optical communication using the optical element of the present invention. This is a demodulator configuration for a differential phase shift keying modulated signal. Differential phase shift keying modulated signal light sent from an optical fiber 801 is converted to parallel light by a collimator 802, enters a half beam splitter 402 and is separated into a first branch light 403 and a second branch light 404 at an intensity ratio of 1:1. The first branch light 403 impinges on a metal groove element 101 at an angle approximate to the right angle, whereby the polarization direction of reflected light is rotated by 90 degrees, the reflected light impinges on the beam splitter 402 again. As a result, the TE polarization component of the polarization components of the first branch light 403 is converted to TM polarization upon re-entering the half beam splitter 402 and the TM polarization component is likewise converted to a TE polarization component. Likewise, the second branch light 404 impinges on a metal groove element 102 at an angle approximate to the right angle, whereby the polarization direction of the reflected light is rotated by 90 degrees, and the reflected light re-enters the beam splitter 402. The first branch light 403 and the second branch light 404 are combined upon re-entering the half beam splitter 402, whereby first interference light 409 and second interference light 410 are generated. Here, the metal groove elements 101 and 102 are arranged so that the difference in the optical path length between the first branch light 403 and the second branch light 404 corresponds to one bit of the modulated light. For example, when the modulation frequency is 40 Gb/s, the difference in the optical path length is approximately 7.5 mm. Thus, the first interference light 409 and the second interference light 410 are placed into a constructive interference state or destructive interference state depending on whether the amount of phase shift keying between neighboring bits of measured light is 0 or π, and as a result, the phase modulated signal is converted to a light intensity signal. These interference light beams are condensed by condensing lenses 803 and 804 to two light receiving sections of a balanced photodetector 805. The balanced photodetector 805 outputs a current signal corresponding to an intensity difference between the interference light beams and this output is converted to a voltage signal by the transimpedance amplifier 806 and an output 807 is finally obtained. In such a configuration, the operation of the metal groove element of the present invention causes the polarization components to be switched and cancel out each other, and as a result, makes the polarization components free from influences of a relative phase difference PDFS generated when the first branch light 403 and the second branch light 404 are branched and combined by the half beam splitter 402, and can thereby demodulate information independent of the state of polarization of signal light.

Embodiment 4

<Active Type Optical Element>

Figure 22:
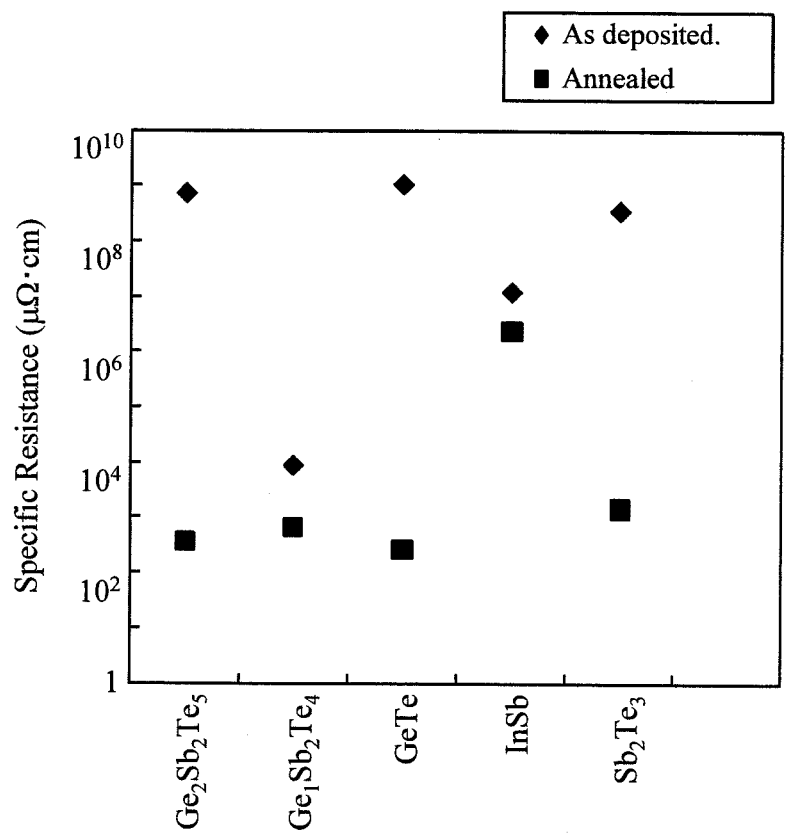
FIG. 22 illustrates measurement results of a variation in resistivity of various chalcogenide thin-films.

The optical element of the present invention can be provided with a comb-like structure using metal and a mirror. By applying a voltage between the two and disposing a material whose optical characteristics change according to the applied voltage between the two, it is possible to realize an optical element capable of actively changing the characteristics through voltage control. An example of the optical material whose characteristics change according to an applied voltage or applied electric field strength is an amorphous chalcogenide thin-film. An amorphous thin-film such as Ge—Sb—Te used as a recording material of an optical disk reversibly changes in phase between an amorphous state and a crystalline state according to irradiation conditions of laser light. On the other hand, when the electric field strength applied is small, such an amorphous thin-film demonstrates high resistance, but when the electric field strength applied reaches the order of 0.01 V/nm, the resistivity starts to decrease and demonstrates substantially the same resistivity as that of a crystalline state at the order of 0.1 V/nm. The variation of resistivity in this case is on the order of one million times. FIG. 22 shows a result of measuring a variation in resistivity between a (amorphous) state in which various chalcogenide thin-films are formed and a (crystal) state in which the chalcogenide thin-films are annealed at approximately 300° C. for 30 minutes. A large variation in resistivity is observed. The fact that the variation in resistivity is small in the $Ge_1Sb_2Te_4$ and InSb thin-films may be attributable to inappropriate film forming conditions and annealing conditions. When the fact that the resistivity changes from an amorphous state to a crystalline state according to the voltage applied and that the imaginary part (attenuation coefficient) of a complex refractive index is expressed by resistivity and frequency of light is taken into consideration, the refractive indexes of these material should also change according to the voltage applied. Here, though the variation in refractive index of the thin-film material could not be measured while applying a voltage, the refractive indexes in the amorphous state and crystalline state can be measured using a spectrophotometer or ellipsometry. Here, a simulation will be performed assuming that the refractive index is placed into a crystalline state by applying a voltage to an amorphous thin-film.

Figure 23:
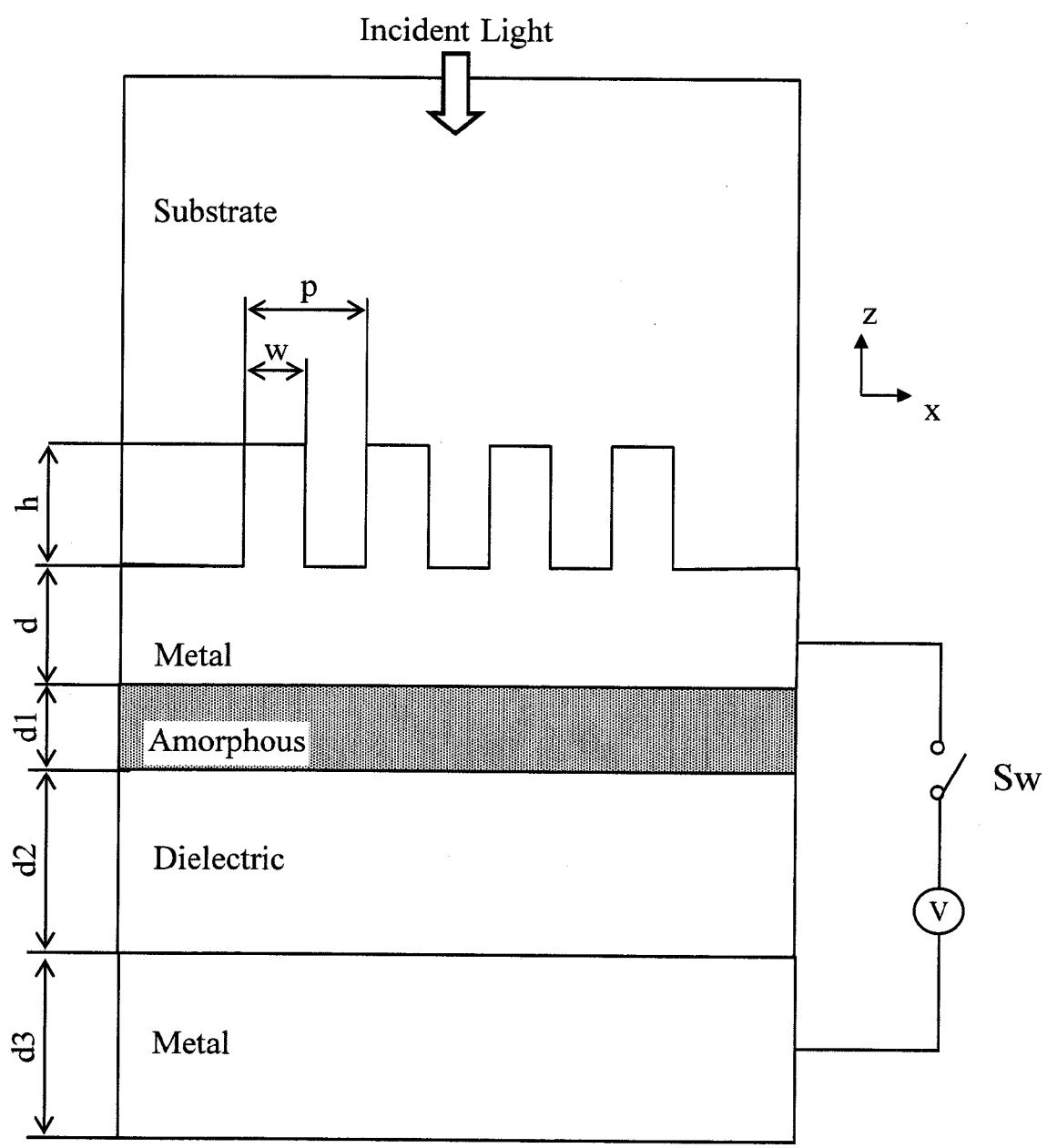
FIG. 23 is a schematic diagram illustrating a configuration of an active type optical element of the present invention.

FIG. 23 is an embodiment illustrating a configuration of an active type optical element of the present invention. In this example, an amorphous thin-film, a dielectric and a metal cathode are configured below a metal groove. In such a configuration, the metal groove and the metal cathode constitute an etalon structure, and it is possible to obtain a large variation in reflectivity and phase through a variation in refractive index of the amorphous material. When, for example, assuming the metal material is Al, the amorphous material is Bi(4 at %)-$Ge_2Sb_2Te_5$, $SiO_2$ is selected as the dielectric material, in the case where the pitch p=200 nm, width w=40 nm, height h=120 nm, the thickness of the mirror part d=20 nm, the thickness of the amorphous layer d1=15 nm, the thickness of the dielectric layer d2=120 nm, it has been proven from the simulation result that the reflection factor changes from 2% to 45% before and after a voltage is applied to TM polarization having wavelength 405 nm.

Figure 24:
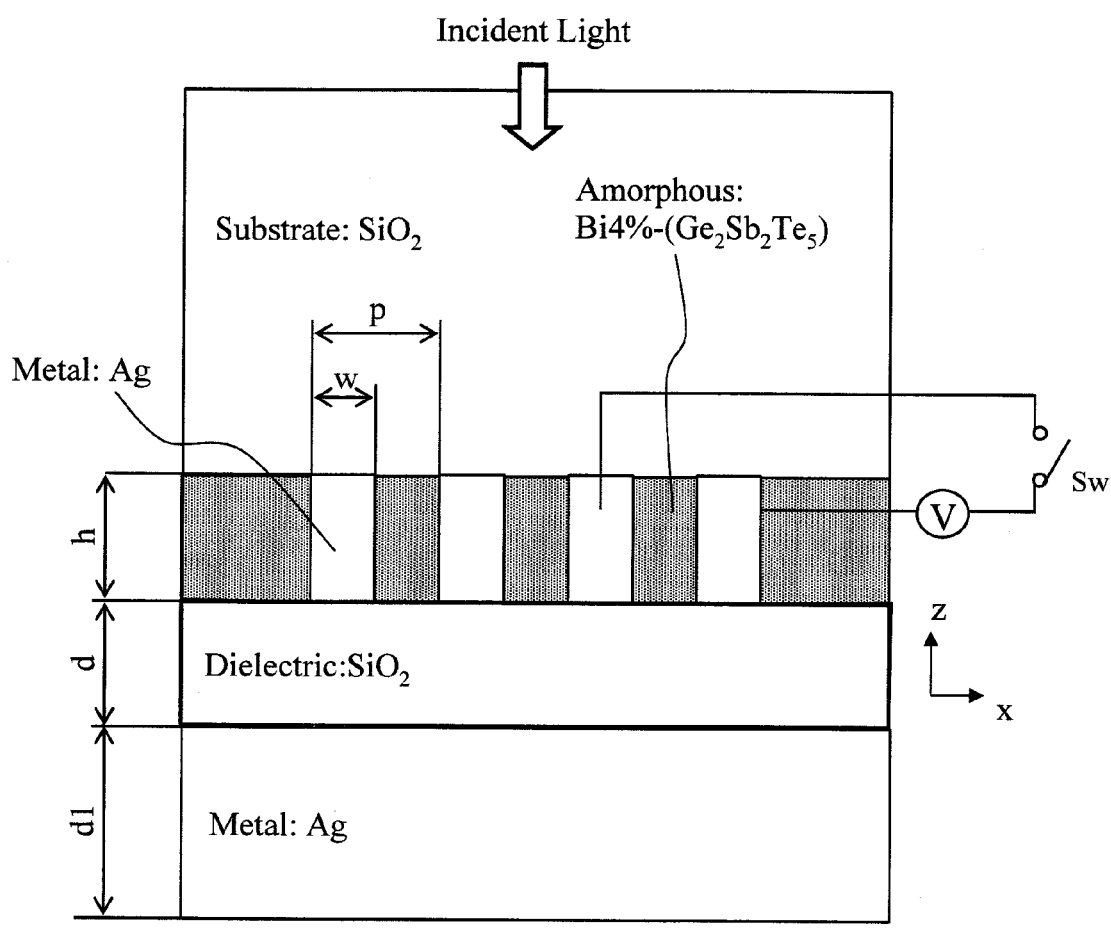
FIG. 24 is a schematic diagram illustrating another configuration of the active type optical element of the present invention.
Figure 25:
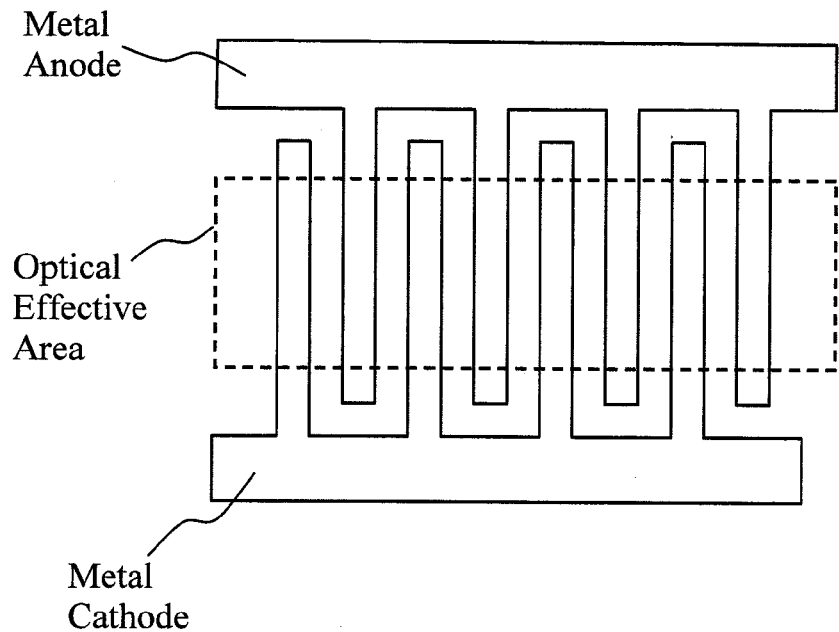
FIG. 25 is a schematic diagram illustrating an electrode structure of the active type optical element of the present invention.

FIG. 24 is another embodiment illustrating a configuration of the active type optical element of the present invention. This example has a configuration in which an amorphous material is arranged between comb-like structures of the metal groove and a voltage can be applied between neighboring comb-like structures. In this case, it is possible to obtain strong interaction even on an amorphous material which is optically nearly transparent using a strong evanescent field generated along the side wall of the comb-like structure. In this case, if a comb-like structure is formed as shown in FIG. 25, it is possible to configure an optical element in which the function as a metal groove and the function as an electrode exist together. In this configuration, a current directly flows through the amorphous material when a voltage is applied. Though power consumption increases, it is possible to obtain a large refractive index difference by using a temperature variation caused by Joule's heat generation and a variation in electric field strength together. Power consumption can be reduced by covering the comb-like structure with a dielectric insulating material such as $SiO_2$ in the same way as a gate insulating film of a MOS transistor and reducing the current flowing through the amorphous material.

The active type optical element shown here requires a voltage control switch and clock source or the like in addition to the power supply, and therefore forming these circuit elements and the metal groove element as a single piece on the chip of a Si substrate using a semiconductor process is appropriate as the manufacturing method.

Furthermore, although a case has been described where the chalcogenide/amorphous thin-film is used, amorphous semiconductor can also be used as the amorphous material. Amorphous silicon is known to have a refractive index different from that of crystalline silicon, demonstrates a particularly large refractive index variation in a wavelength band of 400 to 450 nm, and is therefore an excellent material when a blue color light source is used. Likewise, a material whose refractive index varies with a voltage applied can be used for the active type optical element of the present invention. Using an inorganic material as such a material allows a light switch or phase modulator of higher response speed than a liquid crystal material to be realized. Furthermore, using a material that can obtain a large variation in dielectric constant (variation in refractive index) by a temperature variation close to a Curie point such as barium titanate and providing a heater mechanism which becomes a heat generation source between the electrodes makes it possible to control the phase and intensity of light through temperature control.

The active type optical element of the present invention can be used for (1) replacement of spatial phase modulator in an optical system of hologram recording, (2) adjuster of interference distance between two light beams in an optical pickup or detection module for optical communication using the aforementioned homodyne scheme, (3) replacement of a phase modulator in a transmitter of optical communication, (4) element for reducing correlation crosstalk in an optical pickup compatible with a multi-layer optical disk, and (5) element for suppression of a speckle pattern in a laser projector or the like. (1) to (3) may be easily understandable. (4) and (5) can be realized by applying high frequency phase modulation to light emitted from a light source at a frequency exceeding the band of the detection system (from several tens of MHz to several GHz) and thereby averaging interference between a plurality of light fluxes.

Embodiment 5

<Phase Control Element>

Here, an embodiment of an optical element using a phase difference of light obtained by the metal groove will be described.

Figure 26:
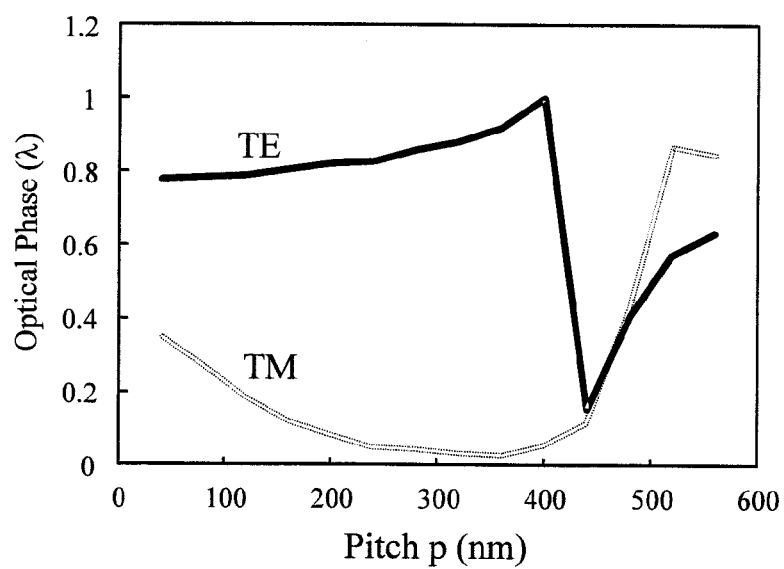
FIG. 26 illustrates simulation results on optical phase.

FIG. 26 illustrates simulation results on a phase difference of light obtained by the metal groove. Here, about the structure shown in FIG. 5, the phase of light when the pitch p is changed is calculated, assuming that the substrate material is $SiO_2$, the metal material is Al, the ratio of pitch p and width w: w/p=0.4, and height h=300 nm. The wavelength of the light source is 780 nm. As shown in FIG. 26, it is understandable that the phase of reflected light can be controlled by changing the pitch. In a region with a pitch of approximately 520 nm or above, a condition is met under which primary diffracted light is generated and it is understandable that a region where there is a large phase variation with respect to the pitch exists in a range of pitch of approximately 400 to 500 nm. For example, in the case of TM polarization, control of phase from 0.37λ to 0.4λ is possible in a region of pitch 400 nm or less.

Figure 9A:
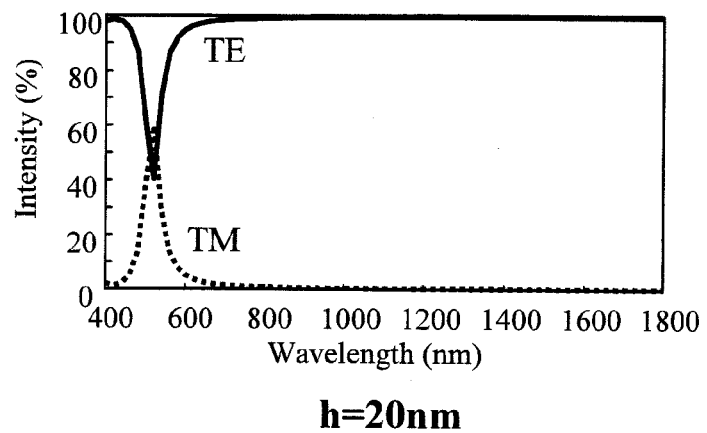
FIGS. 9A to 9C illustrate examples of simulation results on wavelength dependency of the optical element of the present invention.
Figure 9B:
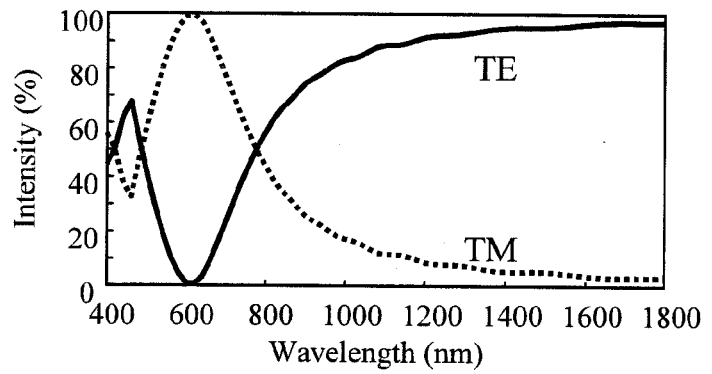
Figure 9C:
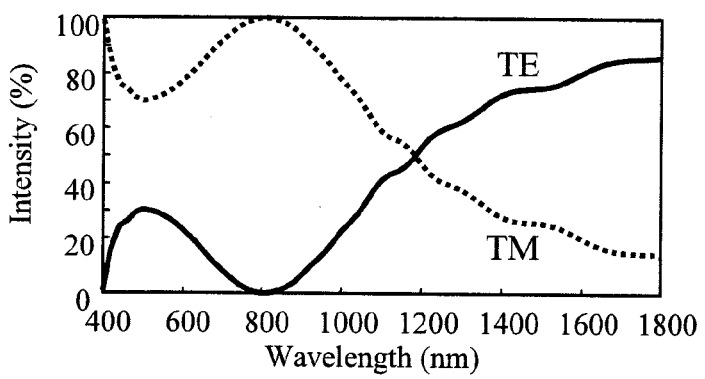
Figure 10:
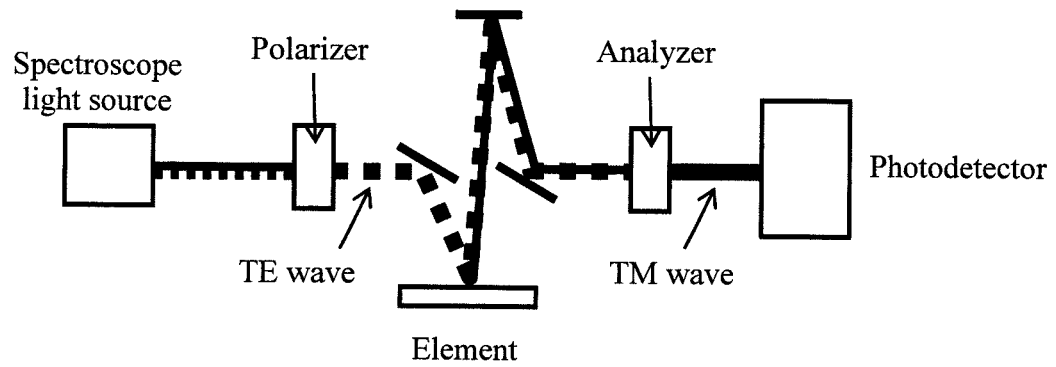
FIG. 10 is a schematic diagram illustrating a configuration of an experimental apparatus for evaluating the optical element of the present invention.
Figure 11:
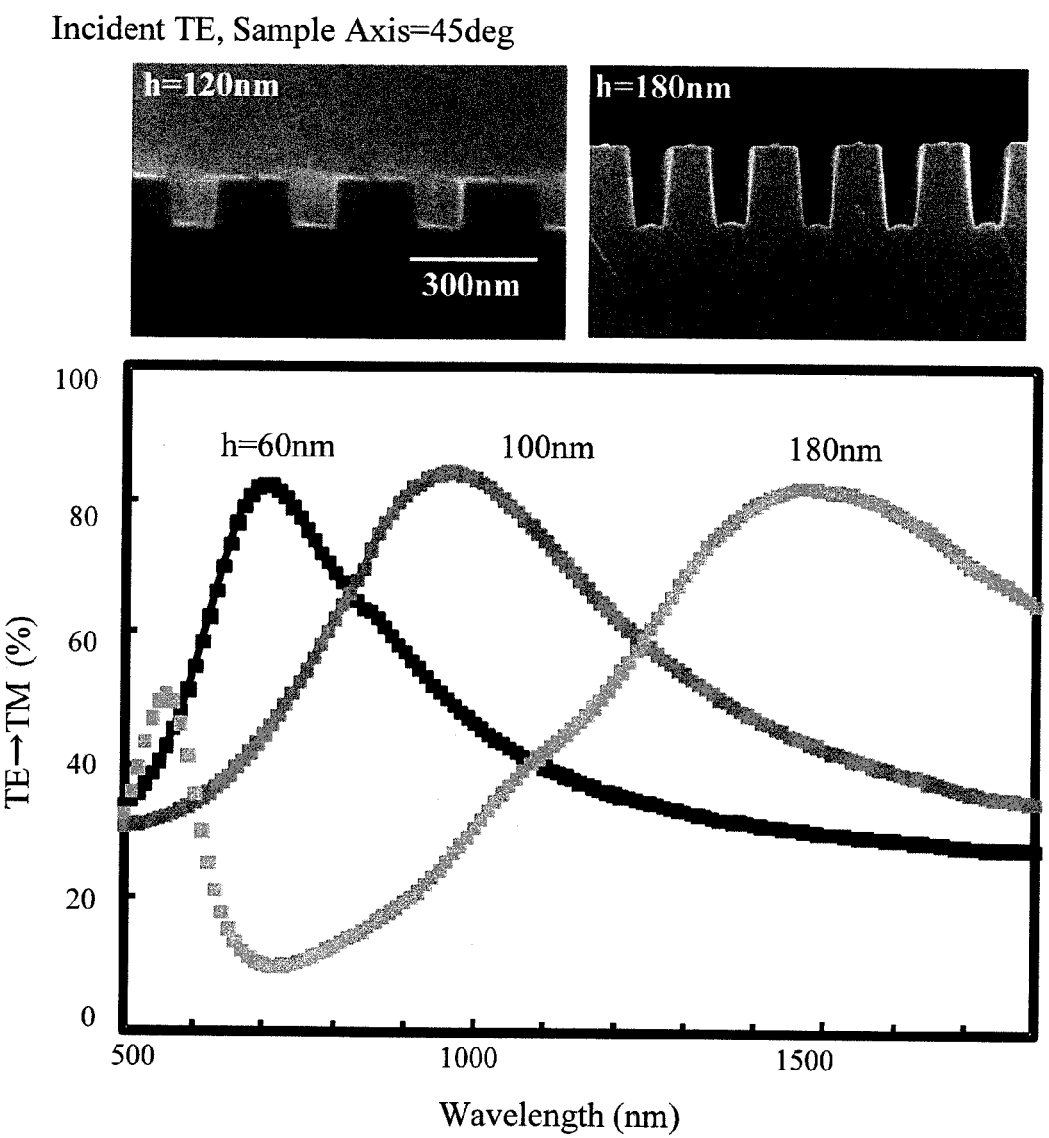
FIG. 11 is a diagram illustrating prototype manufacturing and evaluation results of the optical element of the present invention.
Figure 12:
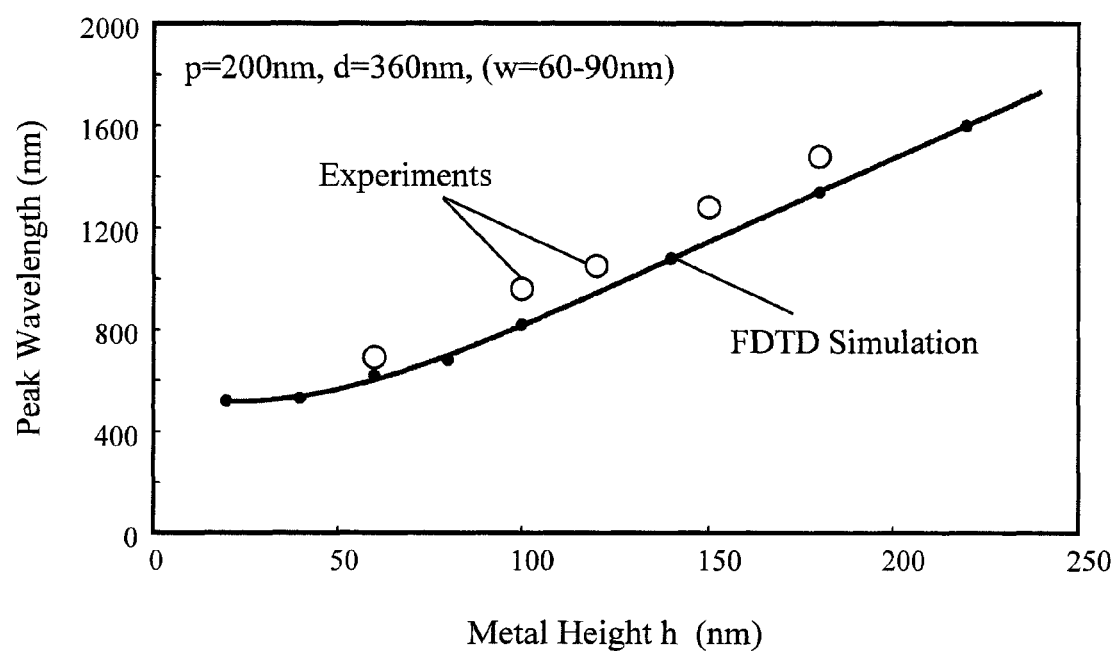
FIG. 12 is a diagram illustrating results of a comparison between an experiment and a simulation of the optical element of the present invention.
Figure 27:
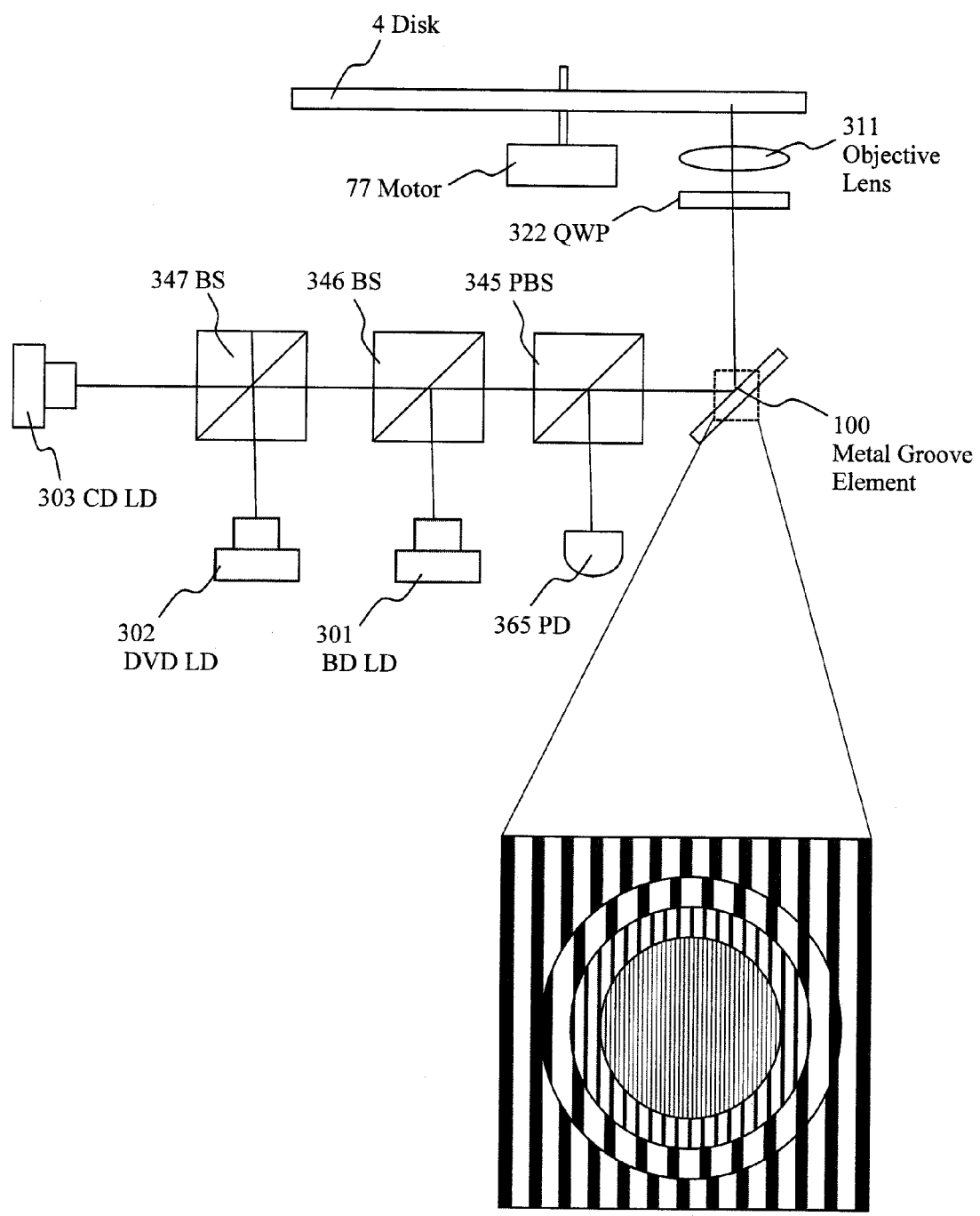
FIG. 27 is an embodiment illustrating a configuration of a three-wavelength interchangeable optical pickup using a phase control element of the present invention.

FIG. 27 is an embodiment illustrating a configuration of a three-wavelength interchangeable optical pickup using a phase difference obtained by the metal groove. In FIG. 27, laser light emitted from BD (Blu-ray Disc) laser 301 (λ=405 nm), DVD laser 302 (λ=660 nm) or CD laser 303 (λ=780 nm) travels along the same optical path by wavelength selective beam splitters 346 and 347, is reflected by a metal groove 100 and condensed to an optical disk 4 by an objective lens 311. Here, when three light beams of different wavelengths are condensed to their respective disks by one objective lens, it is a well known problem that spherical aberration remains. In this case, since the wavelength of BD is different from the wavelength of DVD by approximately 1.5 times, a technique of correcting spherical aberration using a wavelength separation type diffraction grating using this difference. On the other hand, since the relationship between the wavelength of BD and the wavelength of CD is approximately two times, there is a problem that the wavelength separation type diffraction grating does not effectively operate. Optical design is generally performed based on BD having a higher recording density, and therefore CD has technical problems with a reduction of light utilization efficiency and residual spherical aberration. On the other hand, with the metal groove, it is possible to control the selection of an operating wavelength as shown in FIGS. 9A to 9C or the like and a phase difference shown in FIG. 27 by the material of the comb-like structure and shape parameters. FIG. 27 shows an enlarged view of the central portion of the metal groove, and this means that metal grooves of different pitches are formed in a ring shape. Spherical aberration remaining in CD laser light can be corrected using an optical phase difference generated by the metal groove element of such a structure. With the aforementioned wavelength selectivity, BD and DVD can cause the metal groove to function as a reflector. Such a configuration allows performance of the three-wavelength interchangeable optical pickup to improve.

The optical element shown here can be considered to be a combination of a kind of diffraction grating and the metal groove. Since the grating pitch of a diffraction grating used for an optical pickup is generally 10 μm or above, it is also possible to form the convex part of the diffraction grating with the metal groove and provide a hybrid diffraction grating with improved polarization dependency, wavelength selection performance and phase control performance.

Figure 28A:
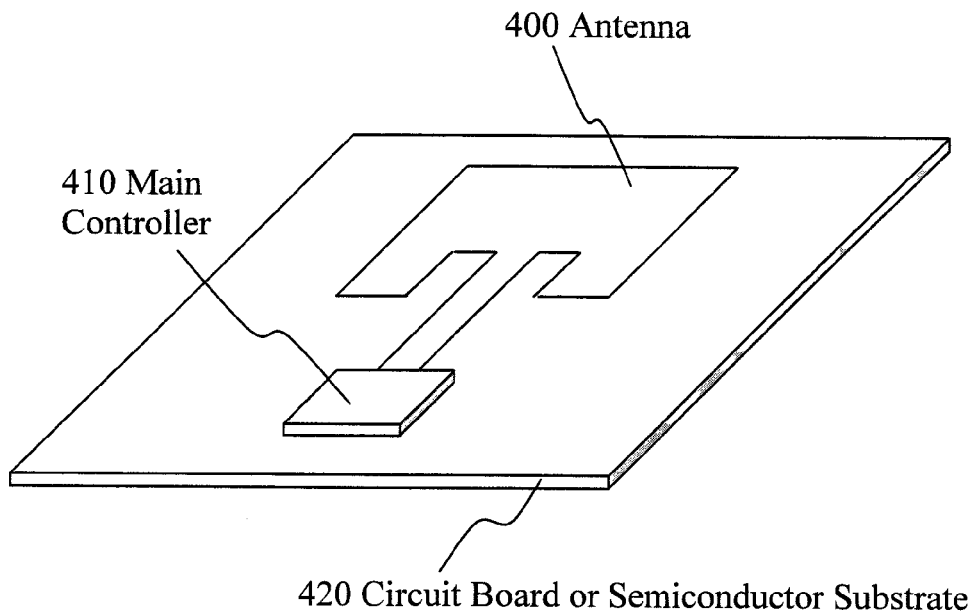
FIG. 28A schematically shows a configuration of a conventional microstrip antenna and FIG. 28B is an embodiment illustrating a configuration of a millimeter wave microstrip antenna using the phase control element of the present invention.
Figure 28B:
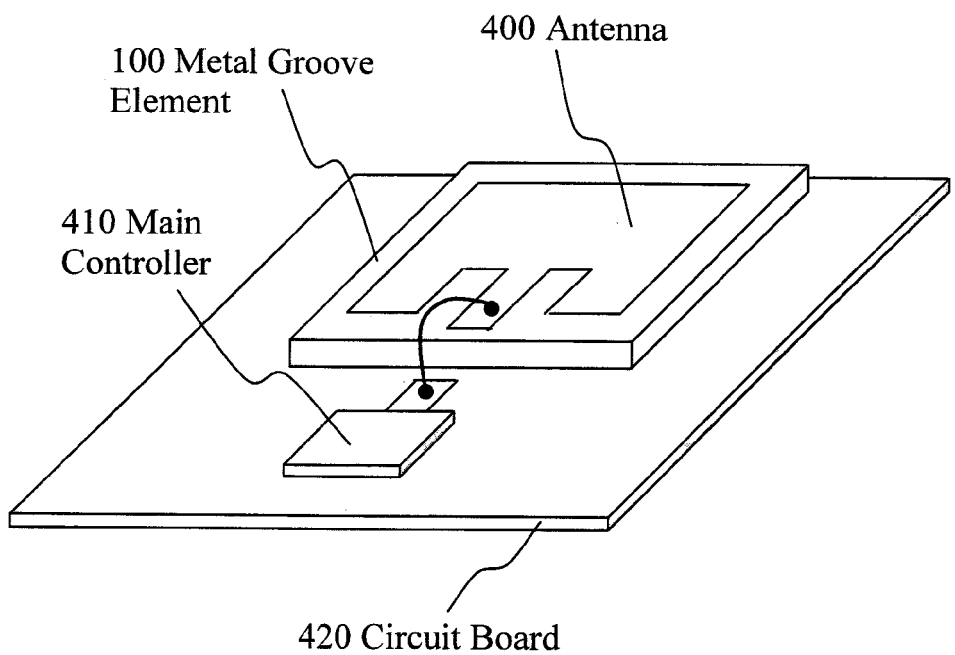
Figure 29:
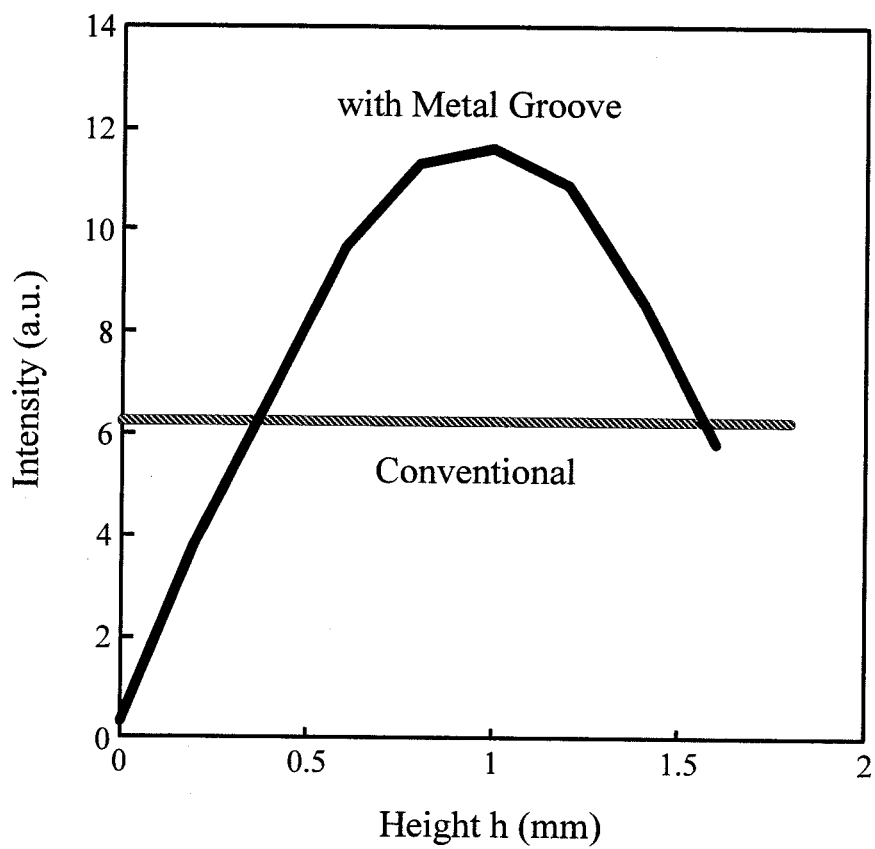
FIG. 29 illustrates simulation results showing improvement of antenna detection using a metal groove.

An element corresponding to light ranging from visible light to near infrared light has been mainly described so far, but the present element is also applicable to a radio wave, which is a kind of light, which will be described further. FIG. 28B is an embodiment illustrating a configuration of a millimeter wave microstrip antenna using a phase control element of the present invention. The microstrip antenna is a kind of antenna and is also called "patch antenna." The microstrip antenna has a feature of having a narrow band and wide directivity and the antenna element can be manufactured at low cost through metal etching. Since the size of the microstrip antenna is determined by the wavelength at a resonance frequency, the microstrip antenna is normally used at frequencies of ultra-high frequency (UHF) or microwave, millimeter wave and used for radio communication apparatuses, vehicle-mounted millimeter wave radars mounted outside aircraft and spaceship or inside vehicles. FIG. 28A schematically shows a configuration of a conventional microstrip antenna. In this case, radio wave (=light) outputted from the antenna is distributed in vertical direction with respect to the antenna surface with symmetry. On the other hand, when the metal groove is arranged below the antenna as shown in FIG. 28B, a radio wave emitted downward is reflected by the metal groove, interferingly added to a radio wave emitted upward, and can be extracted as a double upward output. Thus, it is possible to improve the directivity and output of the antenna. Such a characteristic is effective for vehicle mounted millimeter wave antennas or the like. FIG. 29 illustrates simulation results illustrating improvement of output of the antenna by the metal groove. Here, in the configuration shown in FIG. 28B, assuming the wavelength is 4 mm (77 GH), width of the comb-like structure is 0.05 mm and pitch is 0.5 mm, the relationship between the height h and the intensity of the radio wave outputted was calculated. The metal material was handled as a perfect conductor according to a general calculation technique. As shown in FIG. 29, it is understandable that if the height of the comb-like structure of the metal groove is approximately 1 mm, sensitivity improves approximately twice. At the same time, as for the polarized wave perpendicular to the orientation of the polarized wave outputted (=vibration direction of the electric field), a condition of height 0 in FIG. 29 is set according to the principle shown in FIG. 5 and the radio wave is canceled out by interference with a reflected wave. The effects hereby obtained are (1) the gain in the upward direction of the antenna is double, (2) polarized waves orthogonal to each other are suppressed to substantially 0. Using these effects can improve the output of a vehicle-mounted millimeter wave laser and increase an S/N ratio. The effects are applicable to both transmission and reception antennas.

The antenna configuration described here is not limited to millimeter waves but can be likewise used for microwaves. As the method of manufacturing a metal groove applicable to millimeter waves and microwaves, press work, grinding, etching, plating or the like is preferred.

The present invention allows an optical apparatus for optical communication, optical apparatus for optical recording, display apparatus, apparatus for radio communication or the like to be configured at low cost.

DESCRIPTION OF SYMBOLS 100, 101, 102 Metal groove element
10 Light source
110 Wave guide plate
120 Polarizing filter
130 Input window

What is claimed is:

1. An optical element comprising:
   a wire grid having a polarization separation function; and
   a mirror structure having a reflecting function separate from any reflection from the wire grid,
   wherein the wire grid has a comb-like cross-section and a comb-like structure comprised of a plurality of metal wires arranged parallel to one another and each extended in a direction perpendicular to the comb-like cross-section, the comb-like structure having a pitch equal to or below a wavelength of the incident light and having conductivity for the wavelength of the incident light, and
   wherein a distance between the comb-like structure and the mirror structure is equal to or below a coherence length of the incident light and a phase difference of reflected light is produced between a first polarization direction component of the incident light and a second polarization direction component orthogonal thereto.

2. The optical element according to claim 1, further comprising an optical path length adjusting layer between the wire grid and the mirror structure.

3. The optical element according to claim 1, wherein the wire grid and the mirror structure are formed as one piece.

4. The optical element according to claim 1, wherein the optical element is configured so that high level interference peaks are generated in the optical element.

5. The optical element according to claim 1, wherein the wire grid is comprised of metal.

6. The optical element according to claim 1, wherein convex parts of the wire grid are formed so as to extend in a y-axis direction.

7. The optical element according to claim 1, further comprising a portion comprised of a material whose refractive index varies according to a voltage applied thereto.

8. The optical element according to claim 1, wherein the comb-like structure and the mirror structure are physically separated from one another by a dielectric.

9. An optical apparatus mounted with an optical element, comprising:
   a wire grid having a polarization separation function; and
   a mirror structure having a reflecting function separate from any reflection from the wire grid,
   wherein the wire grid has a comb-like cross-section and a comb-like structure comprised of a plurality of metal wires arranged parallel to one another and each extended in a direction perpendicular to the comb-like cross-section, the comb-like structure having a pitch equal to or below a wavelength of the incident light and having conductivity for the wavelength of the incident light, and
   wherein a distance between the comb-like structure and the mirror structure is equal to or below a coherence length of the incident light and a phase difference of reflected light is produced between a first polarization direction component of the incident light and a second polarization direction component orthogonal thereto.

10. The optical apparatus according to claim 9, wherein the comb-like structure and the mirror structure are physically separated from one another by a dielectric.

11. The optical apparatus according to claim 9, wherein the wire grid and the mirror structure are formed as one piece.

* * * * *

UNITED STATES PATENT AND TRADEMARK OFFICE
CERTIFICATE OF CORRECTION

| | |
|---|---|
| PATENT NO. | : 8,891,168 B2 |
| APPLICATION NO. | : 12/896948 |
| DATED | : November 18, 2014 |
| INVENTOR(S) | : Hiroyuki Minemura et al. |

It is certified that error appears in the above-identified patent and that said Letters Patent is hereby corrected as shown below:

On the title page, item (75) Inventors:

"Hideharu Mikami, Kawaskai (JP)" should read -- Hideharu Mikami, Kawasaki (JP) --

Signed and Sealed this
Eighth Day of September, 2015

Michelle K. Lee
*Director of the United States Patent and Trademark Office*